(12) United States Patent
McCarthy et al.

(10) Patent No.: US 11,286,326 B2
(45) Date of Patent: *Mar. 29, 2022

(54) DUAL-MECHANISM THICKENING AGENTS FOR HYDRAULIC FRACTURING FLUIDS

(71) Applicant: Pilot Polymer Technologies, Inc., Pittsburgh, PA (US)

(72) Inventors: Patrick McCarthy, Pittsburgh, PA (US); Yuanxi Liao, Pittsburgh, PA (US); Liang Huang, Pittsburgh, PA (US)

(73) Assignee: Pilot Polymer Technologies, Inc., Pittsburgh, PA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/875,946

(22) Filed: May 15, 2020

(65) Prior Publication Data

US 2020/0277422 A1 Sep. 3, 2020

Related U.S. Application Data

(63) Continuation of application No. 15/697,179, filed on Sep. 6, 2017, now Pat. No. 10,654,960, which is a continuation of application No. 14/424,852, filed as application No. PCT/US2013/057685 on Aug. 30, 2013, now Pat. No. 9,783,628.

(60) Provisional application No. 61/695,103, filed on Aug. 30, 2012.

(51) Int. Cl.
| | | |
|---|---|---|
| *C08F 293/00* | (2006.01) | |
| *C09K 8/035* | (2006.01) | |
| *C09K 8/88* | (2006.01) | |
| *C09K 8/68* | (2006.01) | |
| *C08F 220/06* | (2006.01) | |
| *C09K 8/92* | (2006.01) | |
| *C09K 8/70* | (2006.01) | |
| *C09K 8/64* | (2006.01) | |

(52) U.S. Cl.
CPC ........ *C08F 293/005* (2013.01); *C08F 220/06* (2013.01); *C09K 8/035* (2013.01); *C09K 8/685* (2013.01); *C09K 8/70* (2013.01); *C09K 8/88* (2013.01); *C09K 8/887* (2013.01); *C09K 8/92* (2013.01); *C08F 2438/01* (2013.01); *C09K 8/64* (2013.01)

(58) Field of Classification Search
CPC .............. C08F 222/1006; C08F 220/06; C08F 293/005; C08F 2438/01; C09K 8/035; C09K 8/64; C09K 8/685; C09K 8/70; C09K 8/88; C09K 8/887; C09K 8/92
See application file for complete search history.

(56) References Cited

U.S. PATENT DOCUMENTS

2011/0112267 A1* 5/2011 Jakubowski .......... C08F 265/04
526/318.6

\* cited by examiner

*Primary Examiner* — Aiqun Li
(74) *Attorney, Agent, or Firm* — Ulmer & Berne, LLP

(57) ABSTRACT

The present invention relates to multi-arm star macromolecules which are used as thickening agents or rheology modifiers, including use in hydraulic fracturing fluid compositions. In one aspect of the invention, a star macromolecule is capable of thickening via a dual mechanism comprising (1) self-assembly of the hydrophobic polymerized segments of the star macromolecules via hydrophobic interactions or associations, and (2) association, reaction, or combination of the hydroxyl-containing polymerized segments of one or more of the star macromolecules.

20 Claims, 3 Drawing Sheets

DUAL-MECHANISM THICKENING AGENTS FOR HYDRAULIC FRACTURING FLUIDS

CROSS-REFERENCE TO RELATED APPLICATIONS

This application is a continuation application of U.S. patent application Ser. No. 15/697,179, filed Sep. 6, 2017, entitled DUAL-MECHANISM THICKENING AGENTS FOR HYDRAULIC FRACTURING FLUIDS, which is a continuation of U.S. patent application Ser. No. 14/424,852, filed Feb. 27, 2015, entitled DUAL-MECHANISM THICKENING AGENTS FOR HYDRAULIC FRACTURING FLUIDS, now issued as U.S. Pat. No. 9,783,628, which is a national stage filing under 35 U.S.C. § 371 of International Patent Application Serial No. PCT/US2013/057685, filed Aug. 30, 2013, entitled DUAL-MECHANISM THICKENING AGENTS FOR HYDRAULIC FRACTURING FLUIDS, which further claims the priority benefit of U.S. Provisional Patent Application Ser. No. 61/695,103, filed on Aug. 30, 2012. Each of the foregoing applications is incorporated herein by reference in their respective entireties. This application is further related to U.S. Provisional Patent Application Ser. No. 61/760,210, filed on Feb. 4, 2013, which is incorporated herein by reference in its entirety. This application is further related to U.S. patent application Ser. No. 12/926,143, filed on Oct. 27, 2010, now U.S. Pat. No. 8,173,750, which is a continuation-in-part of U.S. patent application Ser. No. 12/799,411, filed on Apr. 23, 2010, which claims the priority benefit of U.S. Provisional Patent Application Ser. No. 61/214,397, filed on Apr. 23, 2009, each of which is incorporated herein by reference in their respective entireties.

FIELD OF THE INVENTION

The present invention relates to multi-arm star macromolecules which are used as thickening agents or rheology modifiers, including use in hydraulic fracturing fluid compositions.

SUMMARY OF THE INVENTION

A hydraulic fracture is formed by pumping fracturing fluid into a wellbore hole at a rate sufficient to increase pressure downhole to exceed that of the fracture gradient (pressure gradient) of the rock. The fracture gradient is often defined as the pressure increase per unit of the depth due to its density and it is usually measured in pounds per square inch per foot ($lb/ft^2$). This fracturing process (sometimes referred to as "frac'ing") can result in the rock cracking, which can then allow more fracture fluid to continue further into the rock, thereby extending the crack still further, and so on. Fracturing operators typically try to maintain the "fracture width", or slow its decline, following this treatment by introducing into the injected fluid a proppant—a material such as grains of sand, ceramic, or other particulates, that prevent the fractures from closing when the injection is stopped and the pressure of the fluid is reduced. Consideration of both proppant strength and prevention of proppant failure tend to become more important when conducting fracturings at greater depths where the pressures and stresses on the fractures are higher. The propped fracture is typically permeable enough to allow the flow of formation fluids (e.g., gas, oil, salt water, fresh water and fluids introduced to the formation during completion of the well during fracturing) into the well.

The location of one or more fractures along the length of the wellbore hole is strictly controlled by various methods that create or seal off holes in the side of the wellbore hole. Typically, hydraulic fracturing is performed in cased wellbores and the zones to be fractured are accessed by perforating the casing at those locations.

Hydraulic-fracturing equipment that can be used in oil and natural gas fields usually consists of a slurry blender, one or more high-pressure, high-volume fracturing pumps (typically powerful triplex or quintuplex pumps) and a monitoring unit. Associated equipment can include fracturing tanks, one or more units for storage and handling of proppant, high-pressure treating iron, a chemical additive unit (used to accurately monitor chemical addition), low-pressure flexible hoses, and many gauges and meters for flow rate, fluid density, and treating pressure. Typically, fracturing equipment can operate over a range of pressures and injection rates, and can reach up to 100 megapascals (15,000 psi) and 265 litres per second (9.4 cu ft/s) (100 barrels per minute).

Fracturing fluids: A proppant is a material that will keep a induced hydraulic fracture open, during or following a fracturing treatment, while the hydraulic fracturing fluid itself can vary in composition depending on the type of fracturing used, and the hydraulic fracturing fluid can be gel-based, foam-based, or slickwater-based. In addition, there may be unconventional hydraulic fracturing fluids. Property characteristics or factors that may be considered in selecting a fracturing fluid, or combinations thereof, can include the viscosity of the fluid, where more viscous fluids can carry more concentrated proppant; the energy or pressure demands necessary to maintain a certain flux pump rate (flow velocity) that will conduct the proppant appropriately; pH; and various rheological factors, among others. In addition, hydraulic fracturing fluids may be used in a wide range of situations, such as in low-volume well stimulation of high-permeability sandstone wells (20 k to 80 k gallons per well) to high-volume operations such as shale gas and tight gas that use millions of gallons of water per well.

The two main purposes of fracturing fluid are to extend fractures and to carry proppant into the formation, the latter having the further purpose of the proppant staying there without damaging the formation or production of the well. Two methods of transporting the proppant in the fracturing fluid are used—high-rate methods and high-viscosity methods. High-viscosity fracturing methods tend to cause large dominant fractures, while high-rate (slickwater) fracturing methods cause small, spread-out, micro-fractures.

The fracturing fluid injected into the rock is typically in the form of a slurry of water containing proppants and chemical additives. Additionally, gels, foams, and compressed gases, including nitrogen, carbon dioxide and air can be injected. Typically, of the fracturing fluid, over 98-99.5% is water and sand with the chemicals accounting to about 0.5%.

Hydraulic fracturing may use between 1.2 and 3.5 million US gallons (4.5 and 13 Ml) of fluid per well, with large projects using up to 5 million US gallons (19 Ml). Additional fluid is used when wells are refractured; this may be done several times. Water is by far the largest component of hydraulic fracturing fluids. The initial drilling operation itself may consume from 6,000 to 600,000 US gallons (23,000 to 2,300,000 l; 5,000 to 500,000 imp gal) of hydraulic fracturing fluids.

Initially it is common to pump some amount (normally 6000 gallons or less) of HCl (usually 28%-5%), or acetic acid (usually 45%-5%), to clean the perforations or break down the near wellbore and ultimately reduce pressure seen on the surface. Then the proppant is started and stepped up in concentration.

Proppants

Types of proppant include silica sand, resin-coated sand, and man-made ceramics. These vary depending on the type of permeability or grain strength needed. The most commonly used proppant is silica sand, though proppants of uniform size and shape, such as a ceramic proppant, is believed to be more effective. Due to a higher porosity within the fracture, a greater amount of oil and natural gas is liberated.

The friction reducer is usually a polymer, the purpose of which is to reduce pressure loss due to friction, thus allowing the pumps to pump at a higher rate without having greater pressure on the surface. The process does not work well at high concentrations of proppant thus more water is required to carry the same amount of proppant. For slickwater it is common to include sweeps or a reduction in the proppant concentration temporarily to ensure the well is not overwhelmed with proppant causing a screen-off.

Gelling Chemicals

A variety of chemicals that can be used to increase the viscosity of the fracturing fluid. With any viscosity increase, some type of gelling chemical must be used first. Viscosity is used to carry proppant into the formation, but when a well is being flowed back or produced, it is undesirable to have the fluid pull the proppant out of the formation. For this reason, a chemical known as a breaker is almost always pumped with all gel or crosslinked fluids to reduce the viscosity. This chemical is usually an oxidizer or an enzyme. The oxidizer reacts with the gel to break it down, reducing the fluid's viscosity and ensuring that no proppant is pulled from the formation. An enzyme acts as a catalyst for the breaking down of the gel. Sometimes pH modifiers are used to break down the crosslink at the end of a hydraulic fracture job, since many require a pH buffer system to stay viscous.

The rate of viscosity increase for several gelling agents is pH-dependent, so that occasionally pH modifiers must be added to ensure viscosity of the gel. Typical fluid types include: (1) Conventional linear gels—These gels are cellulose derivatives (carboxymethyl cellulose, hydroxyethyl cellulose, carboxymethyl hydroxyethyl cellulose, hydroxypropyl cellulose, methyl hydroxyl ethyl cellulose), guar or its derivatives (hydroxypropyl guar, carboxymethyl hydroxypropyl guar) based, with other chemicals providing the necessary chemistry for the desired results; (2) Borate-crosslinked fluids—These are guar-based fluids cross-linked with boron ions (from aqueous borax/boric acid solution). These gels have higher viscosity at pH 9 onwards and are used to carry proppants. After the fracturing job the pH is reduced to 3-4 so that the cross-links are broken and the gel is less viscous and can be pumped out. Organometallic-crosslinked fluids zirconium, chromium, antimony, titanium salts are known to crosslink the guar based gels. The crosslinking mechanism is not reversible. So once the proppant is pumped down along with the cross-linked gel, the fracturing part is done. The gels are broken down with appropriate breakers; (3) Aluminium phosphate-ester oil gels—Aluminium phosphate and ester oils are slurried to form cross-linked gel. These are one of the first known gelling systems. They are very limited in use currently, because of formation damage and difficulty in cleanup.

Other chemical additives may be applied to tailor the injected material to the specific geological situation, protect the well, and improve its operation, varying slightly based on the type of well. The composition of injected fluid is sometimes changed as the fracturing job proceeds. Often, acid is initially used to scour the perforations and clean up the near-wellbore area. Afterward, high-pressure fracture fluid is injected into the wellbore, with the pressure above the fracture gradient of the rock. This fracture fluid contains water-soluble gelling agents (such as guar gum) which increase viscosity and efficiently deliver the proppant into the formation. As the fracturing process proceeds, viscosity reducing agents such as oxidizers and enzyme breakers are sometimes then added to the fracturing fluid to deactivate the gelling agents and encourage flowback. At the end of the job the well is commonly flushed with water (sometimes blended with a friction reducing chemical) under pressure. Injected fluid is to some degree recovered and is managed by several methods, such as underground injection control, treatment and discharge, recycling, or temporary storage in pits or containers while new technology is being continually being developed and improved to better handle wastewater and improve reusability. Over the life of a typical gas well, up to 100,000 US gallons (380,000 l; 83,000 imp gal) of chemical additives may be used.

In view of this complex requirement profile, it is clear why, even today, there is still a demand for new thickeners in the hydraulic fracturing fluids field.

Accordingly, in one aspect the invention provides a polymer composition comprising star macromolecules, each star macromolecule having a core and may have five or more arms, wherein the number of arms within a star macromolecule varies across the composition of star molecules; and the arms on a star are covalently attached to the core of the star; each arm comprises one or more (co)polymer segments; and at least one arm and/or at least one segment exhibits a different solubility from at least one other arm or one other segment, respectively, in a reference liquid of interest.

The use of the polymer composition in hydraulic fracturing fluids is also provided.

In one aspect of the invention, there is a star macromolecule polymer composition comprising one or more star macromolecules prepared by an improved, efficient arm-first living-controlled radical polymerization method, wherein the one or more star macromolecules are represented by Formula (I):

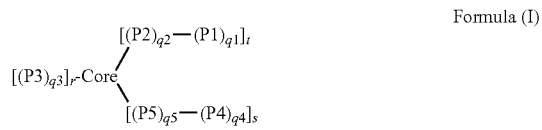

Formula (I)

wherein:
Core represents a crosslinked polymeric segment;
P1 represents a hydrophobic polymeric segment comprised predominantly of repeat units of monomeric residues of polymerized hydrophobic monomers;
P2 represents a hydrophilic polymeric segment comprised predominantly of repeat units of monomeric residues of polymerized hydrophilic monomers;
P3 represents a hydrophilic polymeric segment comprised predominantly of repeat units of monomeric residues of polymerized hydrophilic monomers;
P4 represents a hydroxyl-containing segment (homopolymeric or copolymeric) comprised of repeat units of monomeric residues, where at least one of the monomeric residues or a plurality of the monomeric residues is a hydroxyl-containing monomeric residue, of polymerized monomers;

P5 represents a hydrophilic polymeric segment comprised predominantly of repeat units of monomeric residues of polymerized hydrophilic monomers;

q1 represents the number of repeat units in P1 and has a value between 1 and 50;

q2 represents the number of repeat units in P2 and has a value between 30 and 2000;

q3 represents the number of repeat units in P3 and has a value between 30 and 2000;

q4 represents the number of repeat units in P4 and has a value between 1 and 50;

q5 represents the number of repeat units in P5 and has a value between 30 and 2000;

r represents the number of polymeric arms covalently attached to the Core;

s represents the number of hydroxyl-containing arms covalently attached to the Core; and t represents the number of hydrophobic-containing copolymeric arms covalently attached to the Core; and wherein:
i) the molar ratio of r to s is in the range of between 40:1 and 1:40; and
ii) when t is at least 1:
  a) the molar ratio of r to t is in the range of between 40:1 and 1:40;
  b) the molar ratio of t to s is in the range of between 40:1 and 1:40; or
  c) combinations thereof.

In an aspect of the invention, the one or more star macromolecules represented by Formula (I) may comprise a two-arm type of star macromolecule, such as when t=0. In another aspect of the invention, the one or more star macromolecules represented by Formula (I) may comprise a three-arm type of star macromolecule, such as when t=1 or greater (that is when t is present).

In an aspect of the invention, the hydroxyl-containing copolymeric segment P4 of Formula (I) may comprise repeat units of monomeric residues of polymerized monomers, wherein at least one of the monomeric residues, such as 2, 3, 4, 5 or 6 or more of the monomeric residues, or a plurality of the monomeric residues, is a hydroxyl-containing monomeric residue, and at least one of the monomeric residues or a plurality of the monomeric residues is a hydrophobic monomeric residue. For example, the hydroxyl-containing copolymeric segment P4 of Formula (I) may have hydrophobic characteristics and hydroxyl-containing characteristics, such that P4 may comprise predominantly, substantially, or mostly polymerized hydrophobic monomeric residues and at least one or a plurality of polymerized hydroxyl-containing monomeric residues. In an aspect of the invention, the hydroxyl-containing copolymeric segment P4 of Formula (I) may comprise repeat units of monomeric residues of polymerized monomers, wherein at least one of the monomeric residues or a plurality of the monomeric residues is a hydroxyl-containing monomeric residue, and at least one of the monomeric residues or a plurality of the monomeric residues is a hydrophilic monomeric residue. For example, the hydroxyl-containing copolymeric segment P4 of Formula (I) may have hydrophilic characteristics and hydroxyl-containing characteristics, such that P4 may comprise predominantly, substantially, or mostly polymerized hydrophilic monomeric residues and at least one or a plurality of polymerized hydroxyl-containing monomeric residues.

In one aspect of the invention, a star macromolecule of Formula (I) is capable of thickening via a dual mechanism comprising (1) self-assembly of the hydrophobic polymerized segments of the star macromolecules via hydrophobic interactions or associations, and (2) association, reaction, or combination of the hydroxyl-containing polymerized segments of one or more of the star macromolecules with one or more thickening crosslinking agents, such as boric acid or borate-type additives, for example via esterification of at least one hydroxyl-containing monomeric residue within the hydroxyl-containing polymerized segments of one or more star macromolecules with the thickening crosslinking agents (e.g., boric acid or borate-type additive), such as esterification of at least one hydroxyl-containing monomeric residue within the hydroxyl-containing polymerized segments of a first star macromolecule with the thickening crosslinking agents (e.g., boric acid or borate-type additive), and esterification of at least one hydroxyl-containing monomeric residue within the hydroxyl-containing polymerized segments of a second star macromolecule with said thickening crosslinking agents (e.g., boric acid or borate-type additive).

Polymer compositions comprising the star macromolecules of Formula (I) may be suitable for use in hydraulic fracturing fluids.

The star macromolecules of Formula (I) may be suitable for use as thickening agents, use as rheology modifiers, use in fracturing fluids, use in mining applications, providing salt tolerancy, use in cosmetic and personal care applications, use in home care applications, use in adhesive applications, use in electronic applications, use in medical and pharmaceutical applications, use in paper applications, or use in agricultural applications.

In one aspect the invention provides a polymer composition comprising star macromolecules of Formula (I), each star macromolecule having a core and may have five or more arms, wherein the number of arms within a star macromolecule varies across the composition of star molecules; and the arms on a star are covalently attached to the core of the star; each arm comprises one or more (co)polymer segments; and at least one arm and/or at least one segment exhibits a different solubility from at least one other arm or one other segment, respectively, in a reference liquid of interest.

In one aspect of the invention, the star macromolecules of Formula (I), gel and/or thickening agent, including those formed by a one-pot process, ATRP, CRP, and/or combinations of one or more of these processes, may be used to provide a certain level of control over viscosity and consistency factors in many aqueous and oil based systems including, for example, fracturing fluid additives, gelling agents, gels, proppant stabilizers, breakers, friction reducers, thickening agents.

In another aspect of the invention, the star macromolecules of Formula (I) may be suitable in oil and gas applications, including but not limited to, as rheology modifiers for fracturing fluids/drilling well fluids, gelling agents, gels, dispersants, proppant stabilizers and carriers, breakers, friction reducers, lubricants, scale-buildup inhibitors, heat transfer fluids, thickening agents, additives to improve oil extraction from oil sands, emulsion breakers for oil-sand-water emulsions, or additives to improve dewatering of oil sands.

In another aspect of the invention, the star macromolecules of Formula (I) may be suitable in mining applications, including but not limited to, dust suppressants, flocculating agents, gold and precious metal extraction, and precious metal processing, lubricants and drag reduction agents for pipeline slurry transport.

In another aspect of the invention, the star macromolecules of Formula (I) may be suitable in cosmetic and personal care applications, including but not limited to, cosmetic creams, lotions, gels, sprayable lotion, sprayable cream, sprayable gel, hair styling sprays and mousses, hair conditioners, shampoos, bath preparations, ointments, deodorants, mascara, blush, lip stick, perfumes, powders, serums, skin cleansers, skin conditioners, skin emollients, skin moisturizers, skin wipes, sunscreens, shaving preparations, solids, and fabric softeners.

In another aspect of the invention, the star macromolecules of Formula (I) may be suitable in home care applications, including but not limited to, cleaners for windows and glass, and other household surfaces, toilet areas, enzyme production, drain cleaners, liquid and gelled soaps, polishes and waxes, liquid and powdered detergents including detergents for laundry and in dish washing.

In another aspect of the invention, the star macromolecules of Formula (I) may be suitable in adhesive applications, including but not limited to, associative complexes, billboard adhesives, carpet backsizing compounds, hot melt adhesives, labeling adhesives, latex adhesives, leather processing adhesives, plywood laminating adhesives, paper adhesives, wallpaper pastes, wood glue.

In another aspect of the invention, the star macromolecules of Formula (I) may be suitable in electronic applications, including but not limited to, antistatic film and packaging, conductive inks, rheology control agents used for copper foil production, multilayer ceramic chip capacitors, photoresists, plasma display screens, lubricants for wire, cable, and optical fibers, gel lacquers for coil coating.

In another aspect of the invention, the star macromolecules of Formula (I) may be suitable in medical and pharmaceutical applications, including but not limited to, but not limited to, medical device lubrication, antibacterial coatings, pharmaceutical excipients such as binders, diluents, fillers, lubricants, glidants, disintegrants, polish agents, suspending agents, dispersing agents, plasticizers.

In another aspect of the invention, the star macromolecules of Formula (I) may be suitable in paper applications, including but not limited to, coatings, dispersion for tissue and thin papers, filler retention and drainage enhancement, flocculation and pitch control, grease-proof coatings, adhesives, release coatings, surface sizing, sizes for gloss and ink holdout, tail tie and pickup adhesives for papermaking.

In another aspect of the invention, the star macromolecules of Formula (I) may be suitable in agricultural applications, including but not limited to, animal feed, dispersing agents, drift control, encapsulation, seed coatings, seed tape, spray adherents, water-based sprays and spray emulsions, water-soluble packaging.

In another aspect of the invention, the star macromolecules of Formula (I) may be suitable in other applications including but not limited to, water- and solvent-based coating compositions, water- and solvent-based lubricants, water- and solvent-based viscosity index modifiers, paints, plasticizers, antifoaming agents, antifreeze substances, corrosion inhibitors, detergents, dental impression materials, dental fillers, inkjet printer ink and other inks, ceramic and brick forming, prepolymers such as polyols for use in polyesters, polyurethanes, polycarbonates. For rheology modifier applications, characteristics are high gel strength, stability in the presence of salt and increased temperatures, high shear thinning characteristics, forms versatile low viscosity soluble concentrations, and synergistic interactions with added agents to adjust their rheology profile to optimize properties such as sedimentation, flow and leveling, sagging, spattering, etc.

In one aspect of the invention, there is a star macromolecule having a molecular weight of between 150,000 g/mol and 5,000,000 g/mol that forms a clear homogeneous gel when dissolved in water at a concentration of at least 0.05 wt. % wherein the gel has:
  i) a dynamic viscosity of at least 20,000 cP;
  ii) the dynamic viscosity increases after addition of a thickening crosslinking agent; and/or
  iii) a shear-thinning value of at least 5.

In one aspect of the invention, there is a star macromolecule having a molecular weight of between 150,000 g/mol and 5,000,000 g/mol that forms a clear homogeneous gel when dissolved in water at a concentration of at least 0.05 wt. % wherein the gel has:
  i) a dynamic viscosity of at least 20,000 cP;
  ii) the dynamic viscosity increases after addition of boric acids, boronic acid, borates, borate derivatives thereof, or borate-type additives; and/or
  iii) a shear-thinning value of at least 5.

In one aspect of the invention, there is a star macromolecule having a molecular weight of between 150,000 g/mol and 5,000,000 g/mol that forms a clear homogeneous gel when dissolved in water at a concentration of at least 0.05 wt. % wherein the gel has:
  i) a dynamic viscosity of at least 20,000 cP;
  ii) the dynamic viscosity increases after addition of a thickening crosslinking agent;
  iii) a salt-induced break value of at least 50%;
  iv) a pH-induced break value of at least 50%;
  v) a shear-thinning value of at least 5; or
  vi) combinations thereof.

In one aspect of the invention, there is a clear homogeneous gel, comprising a star macromolecule having a molecular weight of between 150,000 g/mol and 5,000,000 g/mol, comprises the following properties:
  i) a dynamic viscosity of at least 20,000 cP;
  ii) the dynamic viscosity increases after addition of a thickening crosslinking agent;
  iii) a salt-induced break value of at least 50%;
  iv) a pH-induced break value of at least 50%; and/or
  v) a shear-thinning value of at least 10;
wherein the gel is formed when the star macromolecule is dissolved in water at a concentration of at least 0.05 wt. %.

In one aspect of the invention, there is a clear homogeneous gel, comprising a star macromolecule having a molecular weight of between 150,000 g/mol and 5,000,000 g/mol, comprises the following properties:
  i) a dynamic viscosity of at least 20,000 cP;
  ii) the dynamic viscosity increases after addition of boric acids, boronic acid, borates, borate derivatives thereof, or borate-type additives;
  iii) a salt-induced break value of at least 50%;
  iv) a pH-induced break value of at least 50%;
  v) a shear-thinning value of at least 10; and/or
  vi) an emulsion value of >12 hours;
wherein the gel is formed when the star macromolecule is dissolved in water at a concentration of at least 0.05 wt. %.

In one aspect of the invention, there is an emulsifier-free emulsion comprising:
a water-soluble star macromolecule having:
  i) molecular weight of at least 150,000 g/mol; and
  ii) a dynamic viscosity of at least 20,000 cP at a concentration of 0.4 wt. %.

In one aspect of the invention, there is an emulsion comprising:

a water-soluble star macromolecule having:
   i) a molecular weight of at least 150,000 g/mol; and
   ii) a dynamic viscosity of at least 20,000 cP at a concentration of 0.4 wt. %.

In one aspect of the invention, there is a thickening agent that forms a clear homogeneous gel when dissolved in water at a concentration of at least 0.2 wt. %, wherein the gel has:
   i) a dynamic viscosity of at least 20,000 cP;
   ii) a salt-induced break value of at least 60%;
   iii) a pH-induced break value of at least 80%;
   iv) a shear-thinning value of at least 10; and/or
   v) an emulsion value of greater than 12 hours.

In one aspect of the invention, the star macromolecule, emulsifier, gel, emulsifier-free emulsion, emulsion and/or thickening agent, including those formed by the one-pot process, ATRP, CRP, RAFT, TEMPO, Nitroxide, LRP, CRP, anionic polymerization and cationic polymerization, and/or combinations of one or more of these processes, may be used to provide a certain level of control over viscosity and consistency factors in many aqueous and oil based systems including, for example, hydraulic fracturing fluid additives, gelling agents, gels, proppant stabilizers, breakers, friction reducers, thickening agents.

Other applications may include water- and solvent-based coating compositions, paints, detergents, cleaners, inks, antifoaming agents, antifreeze substances, corrosion inhibitors, detergents, oil-well drilling-fluid rheology modifiers, and additives to improve water flooding during enhanced oil recovery.

In one aspect of the invention, there is a macromolecule, comprising: a plurality of arms comprising at least three types of arms, wherein a first-arm-type extends beyond a second-arm-type and said first-arm-type has a hydrophobic segment on its distal end, wherein at least a portion of the hydrophobic segment may extend beyond the length of the second-arm-types either by the size of the monomeric segment or segments (which may be varied by length of monomeric residue, degree of polymerization, and/or both) for which the hydrophobic segment is attached; and wherein a third-arm-type extends beyond a second-arm-type and said third-arm-type has a hydroxyl-containing segment (homopolymeric or copolymeric) on its distal end, wherein at least a portion of the hydroxyl-containing segment (homopolymeric or copolymeric) may extend beyond the length of the second-arm-types either by the size of the monomeric segment or segments (which may be varied by length of monomeric residue, degree of polymerization, and/or both) for which the hydroxyl-containing segment (homopolymeric or copolymeric) is attached.

Recognizing that the "length" of an arm or segment and the "extending beyond" limitation may be theoretical, meaning that while it is not empirically measured it is understood to "extend beyond" and/or have a longer "length" relative to the length of the second-arm-type if the degree of polymerization is greater for monomeric residues of the same type or of the same theoretical length.

In one aspect of the invention, there is a star macromolecule, comprising: a plurality of arms comprising at least three types of arms, wherein the degree of polymerization of a first-arm-type and a third-arm-type are greater than the degree of polymerization of a second-arm-type, and wherein said first-arm-type and third-arm-type have a distal end portion that is hydrophobic and hydroxyl-containing, respectively. In another aspect of the invention, this star macromolecule may be formed by first forming or obtaining the hydrophobic portion and the hydroxyl-containing portion then forming the remaining portion of the first-arm-type from the end of the hydrophobic, the third-arm-type from the end of the hydroxyl-containing portion, and the second-arm-type, in a one-pot synthesis, wherein the polymerization of the second portion of the first-arm-type and the second portion of the third-arm-type are commenced prior to the initialization of the second-arm-type but there is at least some point wherein portions, e.g., substantial portions, of the first-arm-type, third-arm-type, and second-arm-type are being polymerically extended simultaneously. In certain embodiments, the hydroxyl-containing copolymeric arm may extend beyond the distal end of the hydrophobic containing copolymeric arm. In certain embodiments, the hydroxyl-containing copolymeric arm may have a greater degree of polymerization than the hydrophobic containing copolymeric arm.

In one aspect of the invention, there is an oil-soluble star macromolecule, comprising: a plurality of different arms comprising at least three types of arms, wherein a first-arm-type extends beyond a second-arm-type and said first-arm-type has a hydrophilic segment on its distal end, and wherein a third-arm-type extends beyond the second-arm-type and said third-arm-type has a hydroxyl-containing segment (homopolymeric or copolymeric) on its distal end.

In one aspect of the invention, there is an oil-soluble star macromolecule, comprising: a plurality of arms comprising at least three types of arms, wherein the degree of polymerization of a first-arm-type is greater than the degree of polymerization of a second-arm-type, and wherein said first-arm-type has a hydrophilic segment on its distal end, and wherein the degree of polymerization of a third-arm-type is greater than the degree of polymerization of the second-arm-type, and wherein said third-arm-type has a hydroxyl-containing segment (homopolymeric or copolymeric) on its distal end.

In one aspect of the invention, there is a star macromolecule, comprising: a plurality of arms comprising at least three types of arms, wherein the degree of polymerization of a first-arm-type and third-arm-type are greater than the degree of polymerization of a second-arm-type, and wherein said first-arm-type and third-arm-type have a distal end portion that is hydrophobic and hydroxyl-containing, respectively, and the proximal portion of the first-arm-type and the third-arm-type and the second-arm-type are the same with the only difference between the first-arm-type and the third-arm-type and the second-arm-type being that the first-arm-type and the third-arm-type have a hydrophobic and hydroxyl-containing containing portion on their distal ends, respectively. In another aspect of the invention, this star macromolecule may be formed by first forming or obtaining the hydrophobic portion and the hydroxyl-containing portions and then forming the remaining portion of the first-arm-type and third-arm-type from the end of the hydrophobic and hydroxyl-containing portion, respectively, and the second-arm-type simultaneously in a one-pot synthesis.

In an aspect of the invention, the star macromolecules may have an HLB of greater than 0.85, for example greater than 0.87. or 0.9 or 0.93 or 0.95 or 0.97 or 0.98.

In an aspect of the invention, the star macromolecules may have a calculated HLB of greater than 0.85, for example greater than 0.87. or 0.9 or 0.93 or 0.95 or 0.97 or 0.98 and a viscosity of greater than 60,000 cP at a pH between 7 to 10.5 and a molecular weight of between 200,000 g/mol and 550,000 g/mol and a shear-thinning value of at least 10 and, optionally, a salt-induced break value of at least 60%.

In an aspect of the invention, the star macromolecule may be a three-arm type star macromolecule and may have a sum total number of arms (r+s) of between 3 and 1000, or a sum total number of arms (s+t) of between 3 and 1000, or a sum total number of arms (r+t) of between 3 and 1000, or combinations thereof. In an aspect of the invention, the star macromolecule may be a two-arm type star macromolecule and may have a sum total number of arms (r+s) of between 3 and 1000.

In an aspect of the invention, the star macromolecule may be a three-arm type star macromolecule and may have a sum total number of arms (r+s) of between 3 and 500, or a sum total number of arms (s+t) of between 3 and 500, or a sum total number of arms (r+t) of between 3 and 500, or combinations thereof. In an aspect of the invention, the star macromolecule may be a two-arm type star macromolecule and may have a sum total number of arms (r+s) of between 3 and 500.

In an aspect of the invention, the star macromolecule may have a sum total number of arms (r+t) of between 15 and 45, or a sum total number of arms (s+t) of between 15 and 45, or both a sum total number of arms (r+t) and a sum total number of arms (s+t) of each between 15 and 45.

In an aspect of the invention, the star macromolecule may be a two-arm type star macromolecule (e.g., when t=0) and may have a molar ratio of r to s in the range of between 40:1 and 1:40. In an aspect of the invention, the star macromolecule may be a three-arm type star macromolecule (e.g., when t is at least 1 or greater) and may have a molar ratio of r to s in the range of between 40:1 and 1:40, a molar ratio of r to t in the range of between 40:1 and 1:40, or a molar ratio of s to t in the range of between 40:1 and 1:40, or combinations thereof.

In an aspect of the invention, the star macromolecule may have a molar ratio of r to t in the range of between 8:1 and 3:1, or a molar ratio of s to t in the range of between 8:1 and 3:1, or both a molar ratio of r to t and a molar ratio of s to t each in the range of between 8:1 and 3:1.

In an aspect of the invention, the star macromolecule of Formula (I) may have both q2 and q3 may have a value greater than 100, and q2 is greater than q3; or both q5 and q3 may have a value greater than 100, and q5 is greater than q3; or both q2 and q3 may have a value greater than 100, and q5 and q3 have a value greater than 100, and q2 and q5 are greater than q3.

In an aspect of the invention, the arms represented by $[(P1)_{q1}-(P2)_{q2}]$ and $[(P4)_{q4}-(P5)_{q5}]$ of star macromolecule of Formula (I) may have an HLB value greater than 18, e.g., greater than 19.

In an aspect of the invention, the P1 polymeric segment of star macromolecule of Formula (I) may be a predominantly hydrophobic polymeric segment having an HLB value of less than 8.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP; and/or
  ii) a shear-thinning value of at least 10.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP;
  ii) a salt-induced break value of at least 60%;
  iii) a shear-thinning value of at least 10; or
  iv) combinations thereof.

In an aspect of the invention, a dual-mechanism thickening agent may comprise a star macromolecule having a molecular weight of between 150,000 g/mol and 600,000 g/mol that forms a homogeneous gel when dissolved in water at a concentration of at least 0.05 wt. %;
wherein the gel has:
  i) a dynamic viscosity of at least 20,000 cP;
  ii) a salt-induced break value of at least 60%;
  iii) a shear-thinning value of at least 10; or
  iv) combinations thereof;
wherein the gel-forming star macromolecule may further have a viscosity of greater than 40,000 cP at a pH between 6 to 11.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP;
  ii) a salt-induced break value of at least 60%;
  iii) a shear-thinning value of at least 10; and/or
  iv) an emulsion value of greater than 12 hours.

In an aspect of the invention, a dual-mechanism thickening agent may comprise a star macromolecule having a molecular weight of between 150,000 g/mol and 600,000 g/mol that forms a homogeneous gel when dissolved in water at a concentration of at least 0.05 wt. %;
wherein the gel has:
  i) a dynamic viscosity of at least 20,000 cP;
  ii) a salt-induced break value of at least 60%;
  iii) a shear-thinning value of at least 10; and/or
  iv) an emulsion value of greater than 12 hours;
wherein the gel-forming star macromolecule may further have a viscosity of greater than 40,000 cP at a pH between 6 to 11.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP; and/or
  ii) a shear-thinning value of at least 10;
wherein the gel-forming star macromolecule may further have a viscosity of less than 5,000 cP at a shear rate of 4 $sec^{-1}$.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP;
  ii) a shear-thinning value of at least 10; and/or
  iii) a salt-induced break value of at least 60%;
wherein the gel-forming star macromolecule may further have a viscosity of less than 5,000 cP at a shear rate of 4 $sec^{-1}$.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP;
  ii) a salt-induced break value of at least 60%;
  iii) a shear-thinning value of at least 10; or
  iv) combinations thereof;
wherein the gel-forming star macromolecule may further have a viscosity of less than 5,000 cP at a shear rate of 4 $sec^{-1}$.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP;
  ii) a salt-induced break value of at least 60%;
  iii) a shear-thinning value of at least 10; or
  iv) combinations thereof;
wherein the gel-forming star macromolecule may further have a PDI of less than 2.5.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP;
  ii) a salt-induced break value of at least 60%;
  iii) a shear-thinning value of at least 10; or
  iv) combinations thereof;
wherein the gel-forming star macromolecule may have between 15 to 45 arms.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP; and/or
  ii) a shear-thinning value of at least 10;
wherein the arms of the gel-forming star macromolecule may further comprise:
  i) hydrophilic homopolymeric arms;
  ii) copolymeric arms, comprising:
    a) hydrophilic polymeric segments and hydrophobic polymeric segments; and
    b) hydrophilic polymeric segments and copolymeric segment comprising polymerized hydroxyl-containing monomeric residues and hydrophobic monomeric residues.

In an aspect of the invention, a dual-mechanism thickening agent may comprise a star macromolecule having a molecular weight of between 150,000 g/mol and 1,000,000 g/mol that forms a homogeneous gel when dissolved in water at a concentration of at least 0.05 wt. %;
wherein the gel has:
  i) a dynamic viscosity of at least 20,000 cP;
  ii) a salt-induced break value of at least 60%;
  iii) a shear-thinning value of at least 10; or
  iv) combinations thereof;
wherein the arms of the gel-forming star macromolecule may further comprise:
  i) hydrophilic homopolymeric arms;
  ii) copolymeric arms, comprising: a) hydrophilic polymeric segments and hydrophobic polymeric segments; and b) hydrophilic polymeric segments and hydroxyl-containing polymeric segments.

In an aspect of the invention, a fracturing fluid composition, comprising at least 0.05 wt. % of a dual-mechanism thickening agent to improve water flooding during enhanced oil recovery, wherein the dual-mechanism thickening agent is a star macromolecule comprising:
  a) a molecular weight of greater than 100,000 g/mol;
  b) a core having a hydrophobic crosslinked polymeric segment; and
  c) a plurality of arms comprising at least three types of arms, wherein:
    i) a first-arm-type extends beyond a second-arm-type, and said first-arm-type has a hydrophobic segment on its distal end; and
    ii) a third-arm-type extends beyond a second-arm-type, and said third-arm-type has a hydroxyl-containing segment on its distal end;
wherein the rheology-modifying composition has a shear-thinning value of at least 6.

In an aspect of the invention, a fracturing fluid composition, comprising at least 0.05 wt. % of a dual-mechanism thickening agent to improve water flooding during enhanced oil recovery, wherein the dual-mechanism thickening agent is a star macromolecule comprising:
  a) a molecular weight of greater than 100,000 g/mol;
  b) a core having a hydrophobic crosslinked polymeric segment; and
  c) a plurality of arms comprising at least three types of arms, wherein:
    i) a first-arm-type extends beyond a second-arm-type, and said first-arm-type is a copolymeric arm having a hydrophobic polymeric segment on its distal end; and
    ii) a third-arm-type extends beyond the second-arm-type, and said third-arm-type is a copolymeric arm having a hydroxyl-containing polymeric segment on its distal end;
wherein the rheology-modifying composition has a shear-thinning value of at least 6.

In an aspect of the invention, a fracturing fluid composition, comprising at least 0.05 wt. % of a dual-mechanism thickening agent to improve water flooding during enhanced oil recovery, wherein the dual-mechanism thickening agent is a star macromolecule comprising:
  a) a molecular weight of greater than 100,000 g/mol;
  b) a core having a hydrophobic crosslinked polymeric segment; and
  c) a plurality of arms comprising at least three types of arms, wherein:
    i) a first-arm-type extends beyond a second-arm-type, and said first-arm-type has a hydrophobic segment on its distal end; and
    ii) a third-arm-type extends beyond a second-arm-type, and said third-arm-type has a hydroxyl-containing segment on its distal end;
wherein the rheology-modifying composition has a shear-thinning value of at least 6; and wherein the composition may further comprise one or more boric acid or borate-type additives.

BRIEF DESCRIPTION OF THE FIGURES

The following figures exemplify aspects of the disclosed process but do not limit the scope of the process to the examples discussed.

DETAILED DESCRIPTION OF THE INVENTION

Figure 1:
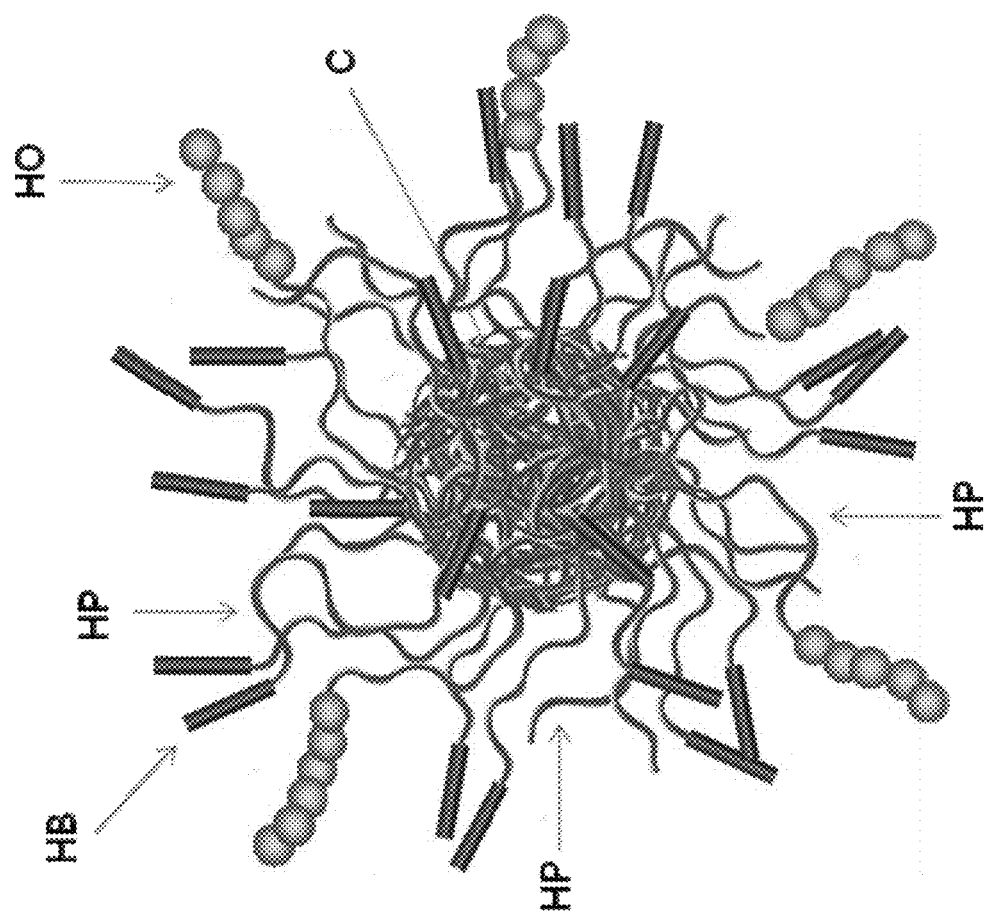
FIG. 1: is a schematic representation of an embodiment of a three-arm type star macromolecule in accordance with of Formula (I), wherein "HB" represents a hydrophobic polymeric segment, "HP" represents a hydrophilic polymeric segment, and "HO" represents a hydroxyl-containing polymeric segment.

The term "solubility" or "soluble" is understood to mean that when a component is mixed into a solvent and tested, at STP in a 1 cm cuvette, it has a light transmittance value, at a wavelength at or around a UV/Vis minimum wavelength for the mixture, of at least 40%, for example, at least 50%, 70%, 85%, or at least 95%.

The term "clear" as is used to describe a homogenous gel or homogenous solution is understood to mean that when the gel or solution is tested, at STP in a 1 cm cuvette, it has a light transmittance value, at a wavelength at or around a UV/Vis minimum wavelength for the gel or solution, of at least 40%, for example, at least 50%, 70%, 85%, or at least 95%.

The term "water-soluble monomer" is understood to mean a monomer having at least about 10 wt. % solubility in water at STP. For example, a water soluble monomer may have at least 15 wt. %, 20 wt. %, 25 wt. %, or at least 30 wt. % solubility in water at STP.

The term "water-insoluble monomer" is understood to mean a monomer having less water solubility than a water soluble monomer, for example, less that about 5 wt. %, such as less than 1 wt. % or 0.5 wt. % solubility in water at STP.

The term "water-soluble star macromolecule" is understood to mean a star macromolecule that is soluble in water, pH adjusted if necessary to a pH of no greater than 8 with sodium hydroxide, at a concentration of at least 5 g/L, for example, between 8 g/L to 100 g/L, such as, at least 10 g/L, 12 g/L, 15 g/L, or at least 20 g/L. For example, a water-soluble star macromolecule having an aqueous solubility of at least 10 g/L may include the introduction of at least 10 g of the star macromolecule into approximately 1 L of water, neutralizing the mixture, if necessary, by adjusting the pH of the resulting mixture to about pH 8 (e.g., with the addition of base, such as sodium hydroxide), and vigorously stirring at a temperature no greater than 100° C. for no more than about 60 minutes, to achieve dissolution of the star macromolecule, and testing the solubility at STP.

The term "oil-soluble star macromolecule" is understood to mean a star macromolecule that is soluble in mineral oil at a concentration of at least 5 g/L, for example, between 8 g/L to 100 g/L, such as, at least 10 g/L, 12 g/L, 15 g/L, or at least 20 g/L of mineral oil. For example, an oil-soluble star macromolecule having an oil solubility of at least 10 g/L may include the introduction of at least 10 g of the star macromolecule into approximately 1 L of mineral oil, and vigorously stirring at a temperature no greater than 100° C. for no more than about 60 minutes, to achieve dissolution of the star macromolecule, and testing the solubility at STP.

The term "hydrophilic" is understood to mean, in relation to a material, such as a polymeric arm, or a polymeric segment of a polymeric arm, that the material is water soluble and comprises hydrophilic segments having an HLB equal to or greater than 8, for example, an HLB equal to 16-20, or equal to or greater than 18, 19, or 19.5. In certain embodiments, the hydrophilic segment may comprise at least 75 mol % of water-soluble monomer residues, for example, between 80 mol % to 100 mol % or at least 85 mol %, 90 mol %, 95 mol %, or at least 97 mol % water-soluble monomer residues.

The term "hydrophobic" is understood to mean, in relation to a material, such as a polymeric arm, or a polymeric segment of a polymeric arm, that the material is water insoluble and comprises hydrophilic segments having an HLB less than 8, for example, an HLB less than 7. In certain embodiments, the hydrophobic segment may comprise at least 75 mol % of water-insoluble monomer residues, for example, between 80 mol % to 100 mol % or at least 85 mol %, 90 mol %, 95 mol %, or at least 97 mol % water-insoluble monomer residues.

The term "monomer residue" or "monomeric residue" is understood to mean the residue resulting from the polymerization of the corresponding monomer. For example, a polymer derived from the polymerization of an acrylic acid monomer (or derivatives thereof, such as acid protected derivatives of acrylic acid including but not limited to methyl or t-butyl ester of acrylic acid), will provide polymeric segments, identified as PAA, comprising repeat units of monomeric residues of acrylic acid, i.e., "—$CH(CO_2H)CH_2$—". For example, a polymer derived from the polymerization of styrene monomers will provide polymeric segments, identified as PS, comprising repeat units of monomeric residues of styrene, i.e., "—$CH(C_6H_5)CH_2$—." For example, a polymer derived from the polymerization of monomeric divinylbenzene monomers will provide polymeric segments comprising repeat units of monomeric residues of divinylbenzene, i.e., "—$CH_2CH(C_6H_5)CHCH_2$—."

The term "emulsifier" is understood to mean a component that comprises an appreciable weight percent of an amphiphilic compound having a molecular weight of less than 5,000 MW. Emulsifiers are usually linear organic compounds that contain both hydrophobic portions (tails) and hydrophilic portions (heads), i.e., are amphiphilic. Examples of emulsifiers include but are not limited to: alkyl benzenesulfonates, alkanesulfonates, olefin sulfonates, alkyl ethersulfonates, glycerol ether sulfonates, alpha-methyl ester sulfonates, sulfofatty acids, alkyl sulfates, fatty alcohol ether sulfates, glycerol ether sulfates, hydroxy mixed ether sulfates, monoglyceride (ether) sulfates, fatty acid amide (ether) sulfates, mono- and dialkylsulfosuccinates, mono- and dialkylsulfosuccinamates, sulfotriglycerides, ether carboxylic acids and salts thereof, fatty acid isethionates, fatty acid sarcosinates, fatty acid taurides, acyl lactylates, acyl tartrates, acyl glutamates, acyl aspartates, alkyl oligoglucoside sulfates, protein fatty acid condensates (particularly wheat-based vegetable products) and alkyl (ether) phosphates, alkylbetaines, alkylamidobetaines, aminopropionates, aminoglycinates, imidazoliniumbetaines and sulfobetaines.

The term "emulsifier-free" is understood to mean a composition or mixture wherein the formulation is substantially devoid of any emulsifiers, for example less than 0.1 wt. % of emulsifier, relative to the total composition, or less than 0.05 wt. % of emulsifier, relative to the total composition, or less than 0.01 wt. % of emulsifier, relative to the total composition, or a formulation where there is no emulsifier.

The term "STP" is understood to mean standard conditions for temperature and pressure for experimental measurements, wherein the standard temperature is a temperature of 25° C. and the standard pressure is a pressure of 1 atm.

The term "hydroxyl" and "hydroxy" is understood to mean the functional group —OH. The term "hydroxyl-containing" or "hydroxy-containing" is understood to mean any monomer, polymer or molecules which have a —OH functional group.

The term "boric acid" or "boronic acid" is understood to mean any additive included in hydraulic fracturing fluids which may contain, release, or evolve, boric acid or compounds which act in the same manner as boric acid ("borate-type" or "borate-type additive" or "borate-type cross-linker"), that is to complex, interact, or crosslink with the hydroxyl-containing polymeric segment, such as a third-arm-type, to impart temporary or permanent crosslinking or increased viscosity.

Structure of the Polymer Composition

As used herein, the term "reference liquid of interest" means the liquid to which the polymer composition will be added. Suitable examples of reference liquids include, but are not limited to, water, oil or mixture thereof or water with additives which include but are not limited to; surfactants, oils, fats and waxes, emulsifiers, silicone compounds, UV protectors, antioxidants, various water soluble substances, biogenic agents, and enzyme inhibitors. Such agents are disclosed in U.S. Pat. Nos. 6,663,855 and 7,318,929 and are herein incorporated by reference to provide definitions for those terms.

Monomer units within the arms may be connected with C—C covalent bonds. This is believed to make them hard to degrade so that the star macromolecule may perform as efficient thickening agent in a harsh environment (very high/low pH or in the presence of strong oxidizing agents).

Suitable crosslinkers for the core encompass all of the compounds which are capable, under the polymerization conditions, of bringing about crosslinking. These include but are not limited di-, tri-, tetra-functional (meth)acrylates, di-, tri- and tetra-functional styrenes and other multi- or poly-functional crosslinkers.

Some examples of the crosslinking agents may include but are not limited to 1,2-divinylbenzene, 1,3-divinylbenzene and 1,4-divinylbenzene, 1,2-ethanediol di(meth)acrylate, 1,3-propanediol di(meth)acrylate, 1,4-butanediol di(meth)acrylate, 1,5-hexanediol di(meth)acrylate, divinylbenzene, ethyleneglycol di(meth)acrylate, propyleneglycol di(meth)acrylate, butyleneglycol di(meth)acrylate, triethyleneglycol di(meth)acrylate, polyethyleneglycol di(meth)acrylate, polypropyleneglycol di(meth)acrylate, polybutyleneglycol di(meth)acrylate, and allyl(meth)acrylate, glycerol di(meth)acrylate, trimethylolpropane tri(meth)acrylate, pentaerythritol tetra(meth)acrylate, allyl methacrylate, allyl acrylate.

The terms 'mostly soluble', 'not fully soluble', and 'not soluble' are used to describe the extent which a composition which is capable of being dissolved in a reference liquid of interest.

The term 'mostly soluble' is used to describe a composition which is capable dissolves completely with exception of a slight cloudiness in the reference liquid of interest. The term 'not fully soluble' is used to describe a composition which disperses with a cloudiness in the reference liquid of interest. The term 'not soluble' is used to describe a composition which does not disperse and remains as a solid in the reference liquid of interest. A list of solvents and non-solvent for polymers can be found in "Polymer Handbook, 4$^{th}$ Ed." edited by Brandrup J.; Immergut, Edmund H.; Grulke, Eric A.; Abe, Akihiro; Bloch, Daniel R., John Wiley & Sons: 2005.

An embodiment of the present invention can be exemplified by a multi-arm star macromolecule wherein the average number of arms in the star macromolecule is between 5 and 500, preferentially between 10 and 250.

In one embodiment, the star macromolecule has a core which contains additional functionality and/or expanded free volume. 'Expended free volume' of the core is defined as the core with lower crosslink density. The free volume in the core is generated when during the crosslinking process of crosslinker with monomer P2 and/or with monomer P5, or crosslinker is used. If P2, P5, or crosslinkers, are monomers with functional groups, these groups will be incorporated in the core.

In one embodiment, the star macromolecule may store and release in controlled rate the small molecules. 'Small molecules' are UV absorbers, minerals, dyes, pigments, solvents, surfactants, metal ions, salts, or oils. These small molecules can be stored inside the core of the star macromolecule and next released. Each small molecule has some affinity to the core, is soluble in the core environment. Higher affinity of the small molecule to the core will result in the lower rate of release from star macromolecule. The affinity may be increased or decreased through non-covalent forces including H-bonding, electrostatic, hydrophobic, coordination and metal chelating interactions.

In one embodiment, the star macromolecule displays shear thinning behavior. 'Shear thinning' is defined as an effect where viscosity decreases with increasing rate of shear stress. The extent of shear thinning behavior is characterized using a Brookfield-type viscometer where viscosities are measured under different shear rates.

In one embodiment, the star macromolecule arms comprise a (co)polymer segment that exhibits an upper, or higher, critical solution temperature (UCST or HCST) whereby the star macromolecule is soluble in a liquid at higher temperature, say above 44° C., then at the lower use temperature the outer shell polymer segments become insoluble and self assemble to form a shear sensitive gel or in another embodiment the invention the outer shell of the star macromolecule arms comprise a (co)polymer segment that exhibits a lower critical solution temperature (LCST), say 5° C., whereby the star macromolecule is soluble in a liquid at lower temperature then at the use temperature the outer shell polymer segments become insoluble and self assemble to form a shear sensitive gel. In the case of a LCST it is envisioned that a copolymer segment with an LCST below 10° C., preferable below 5° C. would be optimal. A non-limiting example would be a copolymerization of BuMA and DMAEMA and preparation of copolymers with designed LCST. A copolymer with 10% BuMA has a LCST close to 0° C. and one would use less BuMA or a less hydrophobic monomer such as MMA to increase the LCST to ~5° C. Indeed the Tg of the segment of the star can be selected to allow dissolution of the star in room temperature aqueous media.

Therefore in a in a non-limiting example the stars comprise a crosslinked core, and arms comprising an water soluble polymeric segment (e.g. poly(acrylic acid), poly(2-hydroxyethyl acrylate), poly(N-isopropylacrylamide), poly(ethylene glycol) methacrylate, quaternized poly(dimethylaminoethyl methacrylate), etc.) and a hydrophobic polymeric segment (e.g. polystyrene or substituted polystyrenes, poly(alkyl(meth)acrylate), etc.) or a hydrocarbon-based segment. Suitable hydrocarbon-based segments can comprise low molecular weight α-olefin. Lower molecular weight α-olefins are commercially available and higher molecular weight species can be prepared by telomerization of ethylene or ethylene propylene mixtures. [Kaneyoshi, H.; Inoue, Y.; Matyjaszewski, K. *Macromolecules* 2005, 38, 5425-5435.]

In an embodiment, the polymer compositions can self assemble in solution to provide a certain level of control over viscosity and consistency factors in many aqueous and oil based systems where control over the rheology is a concern. Applications include; water- and solvent-based coating compositions, paints, inks, anti foaming agents, antifreeze substances, corrosion inhibitors, detergents, oil-well drilling-fluid rheology modifiers, hydraulic fracturing fluid thickening agents, or additives to improve water flooding during enhanced oil recovery, with the rheology modifier providing characteristics of high gel strength, highly shear thinning characteristics, forms versatile low viscosity soluble concentrations, and synergistic interactions with added agents to adjust their rheology profile to optimize properties such as sedimentation, flow and leveling, sagging, spattering, etc.

In certain embodiments, one or more star macromolecules of the present invention may be prepared by an improved, efficient arm-first living-controlled radical polymerization method, wherein the one or more star macromolecules are represented by Formula (I):

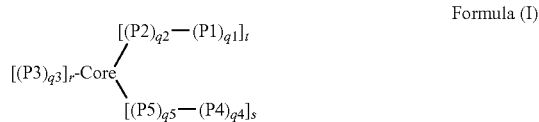

Formula (I)

wherein:
Core represents a crosslinked polymeric segment;
P1 represents a hydrophobic polymeric segment comprised predominantly of repeat units of monomeric residues of polymerized hydrophobic monomers;
P2 represents a hydrophilic polymeric segment comprised predominantly of repeat units of monomeric residues of polymerized hydrophilic monomers;
P3 represents a hydrophilic polymeric segment comprised predominantly of repeat units of monomeric residues of polymerized hydrophilic monomers;
P4 represents a hydroxyl-containing segment (homopolymeric or copolymeric) comprised of repeat units of monomeric residues, where at least one of the monomeric residues or a plurality of the monomeric residues is a hydroxyl-containing monomeric residue, of polymerized monomers;
P5 represents a hydrophilic polymeric segment comprised predominantly of repeat units of monomeric residues of polymerized hydrophilic monomers;
q1 represents the number of repeat units in P1 and has a value between 1 and 50;
q2 represents the number of repeat units in P2 and has a value between 30 and 2000;
q3 represents the number of repeat units in P3 and has a value between 30 and 2000;
q4 represents the number of repeat units in P4 and has a value between 1 and 50;
q5 represents the number of repeat units in P5 and has a value between 30 and 2000;
r represents the number of polymeric arms covalently attached to the Core;
s represents the number of hydroxyl-containing arms covalently attached to the Core; and
t represents the number of hydrophobic-containing copolymeric arms covalently attached to the Core; and
wherein:
i) the molar ratio of r to s is in the range of between 40:1 and 1:40; and
ii) when t is at least 1:
a) the molar ratio of r to t is in the range of between 40:1 and 1:40;
b) the molar ratio of t to s is in the range of between 40:1 and 1:40; or
c) combinations thereof.

In certain embodiments, the one or more star macromolecules represented by Formula (I) may comprise a two-arm type of star macromolecule, such as when t is not present (i.e., t=0). In another aspect of the invention, the one or more star macromolecules represented by Formula (I) may comprise a three-arm type of star macromolecule, such as when t is present (i.e., t=1 or greater).

In certain embodiments, the hydroxyl-containing copolymeric segment P4 of Formula (I) may be represented by P4a, wherein P4a may comprise repeat units of monomeric residues of polymerized monomers, wherein at least one of the monomeric residues or a plurality of the monomeric residues is a hydroxyl-containing monomeric residue, and at least one of the monomeric residues or a plurality of the monomeric residues is a hydrophobic monomeric residue. In certain embodiments, for example, P4a may be represented by the designation of $((P6)_{q6}\text{-}(P7)_{q7})$ or $((P6)_{q6}\text{-co-}(P7)_{q7})$, wherein P6 represents a hydroxyl-containing segment (homopolymeric or copolymeric) comprising repeat units of monomeric residues of polymerized hydroxyl-containing monomers; P7 represents a hydrophobic polymeric segment comprised of repeat units of monomeric residues of polymerized hydrophobic monomers; q6 represents the number of repeat units in P6 and has a value between 1 and 50; q7 represents the number of repeat units in P7 and has a value between 1 and 50; and the sum of q6+q7 equals no more than 50 (i.e., no more than q4), and wherein the term "co" represents that the hydroxyl-containing monomeric residues of P6 are co-polymerized (such as block copolymerization or random copolymerization) with the hydrophobic monomeric residues of P7.

In certain embodiments, the hydroxyl-containing copolymeric segment P4 of Formula (I) may be represented by P4b, wherein P4b may comprise repeat units of monomeric residues of polymerized monomers, wherein at least one of the monomeric residues or a plurality of the monomeric residues is a hydroxyl-containing monomeric residue, and at least one of the monomeric residues or a plurality of the monomeric residues is a hydrophilic monomeric residue. In certain embodiments, for example, P4b may be represented by the designation of $((P6)_{q6}\text{-}(P8)_{q8})$ or $((P6)_{q6}\text{-co-}(P8)_{q8})$, wherein P6 represents a hydroxyl-containing segment (homopolymeric or copolymeric) comprising repeat units of monomeric residues of polymerized hydroxyl-containing monomers; P8 represents a hydrophobic polymeric segment comprised of repeat units of monomeric residues of polymerized hydrophobic monomers; q6 represents the number of repeat units in P6 and has a value between 1 and 50; q8 represents the number of repeat units in P8 and has a value between 1 and 50; and the sum of q6+q8 equals no more than 50 (i.e., no more than q4), and wherein the term "co" represents that the hydroxyl-containing monomeric residues of P6 are co-polymerized with the hydrophobic monomeric residues of P8.

Suitable hydrophobic monomers for P1, for the at least one hydrophobic monomers of P4 and P4a, or P7, that may be used to form an arm or segment of an arm, such as a polymeric segment of an arm, of a star macromolecule may include, but is not limited to styrene, methyl acrylate, ethyl acrylate, n-butyl acrylate, iso-butyl acrylate, t-butyl acrylate, 2-ethylhexyl acrylate, decyl acrylate, octyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; 2-hydroxypropyl acrylate; hydroxypropyl methacrylate; glycidyl methacrylate; glycidyl acrylate, acrylamides, styrene; styrene optionally substituted with one or more C1-C12 straight or branched chain alkyl groups; or alkylacrylate. For example hydrophobic monomers may comprise methacrylate monomers functionalized with thymine, adenine, cytosine, or guanine, or acrylate monomers functionalized with thymine, adenine, cytosine, or guanine, or styrene monomers functionalized with thymine, adenine, cytosine, or guanine, or vinyl monomers functionalized with thymine, adenine, cytosine, or guanine, or acrylamide monomer functionalized with thymine, adenine, cytosine, or guanine. For example, the hydrophobic monomer may comprise styrene; alpha-methylstyrene; t-butylstyrene; p-methylstyrene; methyl methacrylate; or t-butyl-acrylate. For example, the hydrophobic monomer may comprise styrene. In certain embodiments, the hydrophobic monomer may comprise a protected functional group.

In certain embodiments, the star macromolecules as defined by Formula (I) comprise a hydrophobic polymeric segment represented by P1, which is comprised predominantly of repeat units of monomeric residues of polymerized hydrophobic monomers, for example, P1 may be comprised substantially, mostly, or entirely of repeat units of monomeric residues of polymerized hydrophobic monomers. In certain embodiments, the hydrophobic polymeric segment represented by P1 may be a hydrophobic copolymeric segment comprised of one or more different polymerized hydrophobic monomeric residues, such as two or three different hydrophobic monomeric residues copolymerized (in either block or random copolymerization form).

Suitable star macromolecules, according to Formula (I), may include star macromolecules wherein, P4a represents a block or random hydroxyl-containing copolymeric segment comprised of repeat units of monomeric residues of polymerized monomers, wherein at least one of the monomeric residues or a plurality of the monomeric residues is a hydroxyl-containing monomeric residue, and at least one of the monomeric residues or a plurality of the monomeric residues is a hydrophobic monomeric residue; wherein q4a may have a value of between 1 to 100, for example, between 1 to 60, such as, between 1 to 45; between 5 to 40; between 8 to 35; between 10 to 30; between 12 to 25; between 14 to 20; between 15 to 30; or between 5 to 20; and wherein the molar ratio of r to s may be in the range of between 40:1 to 1:40, for example between 40:1 to 2:1, such as between 8:1 to 3:1, and when t is at least 1: the molar ratio of r to t may be in the range of between 40:1 to 1:40, for example between 40:1 to 2:1, such as between 8:1 to 3:1 the molar ratio oft to s may be in the range of between 40:1 to 1:40, for example between 40:1 to 2:1, such as between 8:1 to 3:1, or combinations thereof.

In certain embodiments, for example, P4a may be represented by the designation of $((P6)_{q6}\text{-}(P7)_{q7})$ or $((P6)_{q6}\text{-co-}(P7)_{q7})$, wherein P6 represents a hydroxyl-containing segment (homopolymeric or copolymeric) comprising repeat units of monomeric residues of polymerized hydroxyl-containing monomers; P7 represents a hydrophobic polymeric segment comprised of repeat units of monomeric residues of polymerized hydrophobic monomers; q6 represents the number of repeat units in P6 and has a value between 1 and 50; q7 represents the number of repeat units in P7 and has a value between 1 and 50; and the sum of q6+q7 equals no more than 50 (i.e., no more than q4), and wherein the term "co" represents that the hydroxyl-containing monomeric residues of P6 are co-polymerized (such as block copolymerization or random copolymerization) with the hydrophobic monomeric residues of P7.

Suitable hydrophilic monomers for P2, P3, for the at least one hydrophilic monomers of P4 and P4b, P5, or P8, that may be used to form an arm or segment of an arm, such as a polymeric segment of an arm, of a star macromolecule may include, but is not limited to, 2-Acrylamido-2-methylpropane sulfonic acid (AMPS), styrene sulphonic acid, protected and unprotected acrylic acids and methacrylic acids including; ethacrylic acid, methyl acrylate, ethyl acrylate, d-butyl acrylate, iso-butyl acrylate, t-butyl acrylate, 2-ethylhexyl acrylate, decyl acrylate, octyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; 2-hydroxyethyl acrylate; 2-hydroxypropyl acrylate; hydroxypropyl methacrylate; glyceryl monoacrylate; glyceryl monoethacrylate; glycidyl methacrylate; glycidyl acrylate; acrylamide; methacrylamide; ethacrylamide; N-methyl acrylamide; N,N-dimethyl acrylamide; N,N-dimethyl methacrylamide; N-ethyl acrylamide; N-isopropyl acrylamide; N-butyl acrylamide; N-t-butyl acrylamide; N,N-di-n-butyl acrylamide; N,N-diethylacryl amide; N-octyl acrylamide; N-octadecyl acrylamide; N,N-diethylacryl amide; N-phenyl acrylamide; N-methyl methacrylamide; N-ethyl methacrylamide; N-dodecyl methacrylamide; N,N-dimethylaminoethyl acrylamide; quaternised N,N-dimethylaminoethyl acrylamide; N,N-dimethylaminoethyl methacrylamide; quaternised N,N-dimethylaminoethyl methacrylamide; N,N-dimethylaminoethyl acrylate; N,N-dimethylaminoethyl methacrylate; quaternised N,N-dimethyl-aminoethyl acrylate; quaternised N,N-dimethylaminoethyl methacrylate, 2-hydroxyethyl acrylate; 2-hydroxyethyl methacrylate; 2-hydroxyethyl ethacrylate; glyceryl acrylate; 2-methoxyethyl acrylate; 2-methoxyethyl methacrylate; 2-methoxyethyl ethacrylate; 2-ethoxyethyl acrylate; 2-ethoxyethyl methacrylate; 2-ethoxyethyl ethacrylate; maleic acid; maleic anhydride and its half esters; fumaric acid; itaconic acid; itaconic anhydride and its half esters; crotonic acid; angelic acid; diallyldimethyl ammonium chloride; vinyl pyrrolidone vinyl imidazole; methyl vinyl ether; methyl vinyl ketone; maleimide; vinyl pyridine; vinyl pyridine-N-oxide; vinyl furan; styrene sulphonic acid and its salts; allyl alcohol; allyl citrate; allyl tartrate; vinyl acetate; vinyl alcohol; vinyl caprolactam; vinyl acetamide; or vinyl formamide. For example, the hydrophilic monomer may comprise protected and unprotected acrylic acid, such as methacrylic acid, ethacrylic acid, methyl acrylate, ethyl acrylate, á-butyl acrylate, iso-butyl acrylate, t-butyl acrylate, 2-ethylhexyl acrylate, decyl acrylate, octyl acrylate; methyl acrylate; methyl methacrylate; methyl ethacrylate; ethyl acrylate; ethyl methacrylate; ethyl ethacrylate; n-butyl acrylate; n-butyl methacrylate; n-butyl ethacrylate; 2-ethyl hexyl acrylate; 2-ethylhexyl methacrylate; 2-ethylhexyl ethacrylate; N-octyl acrylamide; 2-methoxyethyl acrylate; 2-hydroxyethyl acrylate; N,N-dimethylaminoethyl acrylate; N,N-dimethylaminoethyl methacrylate; acrylic acid; methacrylic acid; N-t-butylacrylamide; N-sec-butylacrylamide; N,N-dimethylacrylamide; N,N-dibutylacrylamide; N,N-dihydroxyethyllacrylamide; 2-hydroxyethyl acrylate; 2-hydroxyethyl methacrylate; benzyl acrylate; 4-butoxycarbonylphenyl acrylate; butyl acrylate; 4-cyanobutyl acrylate; cyclohexyl acrylate; dodecyl acrylate; 2-ethylhexyl acrylate; heptyl acrylate; iso-butyl acrylate; 3-methoxybutyl acrylate; 3-methoxypropyl acrylate; methyl acrylate; N-butyl acryl amide; N,N-dibutyl acrylamide; ethyl acrylate; methoxyethyl acrylate; hydroxyethyl acrylate; or diethyleneglycolethyl acrylate. For example, the hydrophilic monomer may comprise protected and unprotected acrylic acid, such as methacrylic acid, ethacrylic acid, methyl acrylate, ethyl acrylate, α-butyl acrylate, iso-butyl acrylate, t-butyl acrylate, 2-ethylhexyl acrylate, decyl acrylate, octyl acrylate; 2-hydroxyethyl acrylate; N-isopropylacrylamide; ethylene glycol methacrylate; (polyethylene glycol) methacrylate; or quaternized dimethylaminoethyl methacrylate. For example, the hydrophilic monomer may comprise acrylic acid, methacrylic acid, 2-hydroxyethyl acrylate, acrylamide, vinyl pyrrolidone, vinyl pyridine, styrene sulphonic acid, PEG-methacrylate, 2-(dimethylamino)ethyl methacrylate, 2-(trimethylamino)ethyl methacrylate, 2-acrylamido-2-methylpropane sulphonic acid, Acrylic acid, Acrylic anhydride, Beta-Carboxyethyl Acrylate, Methacrylic acid, 4-Methacryloxyethyl trimellitic anhydride, 3-Methacryloyl-(l)-lysine, o-Nitrobenzyl methacrylate, 2-Propene-1-sulfonic acid, 2-Sulfoethyl methacrylate, Trichloroacrylic acid, 4-Vinylbenzoic acid, acrylamide/s, 2-(N,N-Dimethylamino)-ethyl acrylate, N-[2-N,N-Dimethylamino)-ethyl] methacrylamide, 2-(N,N-Dimethylamino)-ethyl methacrylate, 3-Dimethylaminoneopentylacrylate, N-[3-(N,N-methylamino)-propyl]acrylamide, N-[3-(N,N-Dimethylamino)-propyl] methacrylamide, 2-N-Morpholinoethyl acrylate, 2-N-Morpholinoethyl methacrylate, 3-Methacryloyl-(l)-lysine, N,N-Diallylamine, Diallyldimethyl, 2-Aminoethyl methacrylamide, N-(2-aminoethyl) methacrylamide hydrochloride, N-(3-Aminopropyl)-methacrylamide hydrochloride, N-(t-BOC-aminopropyl)-acrylamide, 2-(t-Butylamino)ethyl methacrylate, 2-(N, N-Diethylamino)-ethyl methacrylate (DEAEMA), 2-Diisopropylaminoethyl methacrylate. For example, the hydrophilic monomer may comprise acrylic acid.

Suitable star macromolecules, according to Formula (I), may include star macromolecules wherein, P4b represents a block or random hydroxyl-containing copolymeric segment comprised of repeat units of monomeric residues of polymerized monomers, wherein at least one of the monomeric residues or a plurality of the monomeric residues is a hydroxyl-containing monomeric residue, and at least one of the monomeric residues or a plurality of the monomeric residues is a hydrophilic monomeric residue; wherein q4b may have a value of between 1 to 100, for example, between 1 to 60, such as, between 1 to 45; between 5 to 40; between 8 to 35; between 10 to 30; between 12 to 25; between 14 to 20; between 15 to 30; or between 5 to 20; and wherein the molar ratio of r to s may be in the range of between 40:1 to 1:40, for example between 40:1 to 2:1, such as between 8:1 to 3:1, and when t is at least 1: the molar ratio of r to t may be in the range of between 40:1 to 1:40, for example between 40:1 to 2:1, such as between 8:1 to 3:1, the molar ratio of t to s may be in the range of between 40:1 to 1:40, for example between 40:1 to 2:1, such as between 8:1 to 3:1, or combinations thereof.

In certain embodiments, for example, P4b may be represented by the designation of $((P6)_{q6}\text{-}(P8)_{q8})$ or $((P6)_{q6}\text{-co-}(P8)_{q8})$, wherein P6 represents a hydroxyl-containing segment (homopolymeric or copolymeric) comprising repeat units of monomeric residues of polymerized hydroxyl-containing monomers; P8 represents a hydrophobic polymeric segment comprised of repeat units of monomeric residues of polymerized hydrophobic monomers; q6 represents the number of repeat units in P6 and has a value between 1 and 50; q8 represents the number of repeat units in P8 and has a value between 1 and 50; and the sum of q6+q8 equals no more than 50 (i.e., no more than q4), and wherein the term "co" represents that the hydroxyl-containing monomeric residues of P6 are co-polymerized with the hydrophobic monomeric residues of P8.

Suitable hydroxyl-containing monomers for P4, P4a, P4b, or P6 that may be used to form a hydroxyl-containing segment may include, but are not limited to, HEA (hydroxyethyl acrylate), HEMA (hydroxyethyl methacrylate), poly ethoxy ethyl methacrylate, 1-(acryloyloxy)-3-(methacryloyloxy)-2-propanol, 1,1,1-trimethylolpropane diallyl ether, 1,1,1-trimethylolpropane monoallyl ether, 1,3-glyceryl dimethacrylate, 2-hydroxy-3-chloropropyl methacrylate, 2-hydroxyethyl acrylate, 2-hydroxyethyl methacrylate, low acid grade, 2-hydroxypropyl acrylate, 4-(2-acryloxyethoxy)-2-hydroxybenzophenone, 4-hydroxybutyl acrylate, 4-methacryloxy-2-hydroxybenzophenone, 4-tert-butoxystyrene, beta-carboxyethyl acrylate, bisphenol a-bis(2-hydroxypropyl) acrylate, glycerol monomethacrylate, hydroxypolyethoxy allyl ether, hydroxypropyl methacrylate, N-(2-hydroxypropyl)methacrylamide, n-hydroxyethyl acrylamide, poly(ethylene glycol) (2000) monomethacrylate, poly(propylene glycol) (300) monomethacrylate, sorbitol acrylate, sorbitol methacrylate, pentaerythritol mono-acrylate, pentaerythritol mono-methacrylate, N-[tris(hydroxymethyl) methyl] acrylamide, trimethylolpropane monoallyl ether, sodium 1-allyloxy-2 hydroxypropyl sulfonate, guar, cellulose, carbohydrates, proteins, peptides, sialic acids, glycosylates, glycopolymers, vinyl alcohol, poly(vinyl alcohol), keratin, carrageenan, guar like substances.

Suitable monomers that may be used to form a core of a star macromolecule may include, but are not limited to, a multifunctional monomer, for example, a hexafunctional monomer, a pentafunctional monomer, a tetrafunctional monomer, a trifunctional monomer, or a difunctional monomer. For example, a crosslinker may be a hydrophobic monomer or a hydrophilic monomer, such as a hydrophobic multifunctional monomer or a hydrophilic multifunctional monomer, for example, a hydrophobic difunctional monomer or a hydrophilic difunctional monomer. For example, the crosslinker may be a hydrophobic crosslinker, including, but not limited to, 1,2-divinylbenzene; 1,3-divinylbenzene; 1,4-divinylbenzene; 1,2-ethanediol di(meth)acrylate; 1,3-propanediol di(meth)acrylate; 1,4butanediol di(meth)acrylate, 1,5-hexanediol di(meth)acrylate; divinylbenzene; ethyleneglycol di(meth)acrylate; di(ethylene glycol) diacrylate (DEGlyDA); propyleneglycol di(meth)acrylate; butyleneglycol di(meth)acrylate; triethyleneglycol di(meth)acrylate; polyethyleneglycol di(meth)acrylate; polypropyleneglycol di(meth)acrylate; polybutyleneglycol di(meth) acrylate; allyl(meth)acrylate; glycerol di(meth)acrylate; trimethylolpropane tri(meth)acrylate; pentaerythritol tetra (meth)acrylate; allyl methacrylate; or allyl acrylate. For example, the crosslinker may be di(ethylene glycol) diacrylate (DEGlyDA) or divinylbenzene. For example, the crosslinker may be divinylbenzene.

Suitable thickening crosslinkers (or thickening crosslinking agent) may include, but are not limited to boric acid, borates, boronic acids, sodium borate, mineralized borate, mineralized boric acid, borax, time-released boric acid additives, boric acid derivatives, borate-type additives, such as borates, aluminum (including aluminates), zirconium (including zirconates), and titanium (including titanates), chromium (including chromates), antimony (including antimonates) containing compounds. These suitable thickening crosslinkers (sometimes referred to as thickening boric acid crosslinkers or thickening boron-type crosslinkers), work by chemically linking together (crosslinking) linear polymers, such as star macromolecules comprising hydroxyl-containing polymeric arms) in a hydraulic fracturing fluid creating higher molecular weight polymer compounds. Selection of the particular thickening crosslinking agent may be based upon the type of gelling agent being used in the hydraulic fracturing fluid. For example, the thickening crosslinking agent may include crosslinking with boron ions, such as from an aqueous borax/boric acid solution (such as to prepare a borate-crosslinked hydraulic fracturing fluid). For example, the thickening crosslinking agent, such as an aluminium phosphate, aluminium ester, or aluminium phosphate-ester, may be employed to form a crosslinked gel system. In addition, the pH of the water in the hydraulic fracturing fluid may be in the range of about 7-11, such as 8-10, to permit effective crosslinking to occur.

In certain embodiments, the star macromolecule composition of the present invention, when dissolved in water at a concentration of 0.6 wt. % form a homogeneous gel, and have an increase in dynamic viscosity of at least 5,000 cP in a 0.2 wt. % Borax aqueous solution, according to the Borate-Crosslinker Thickening Test, relative to the dynamic viscosity of the homogeneous gel with 0.0 wt % Borax aqueous solution (i.e., in the absence of Borax crosslinker thickening agent). For example, in certain embodiments, the star macromolecule composition of the present invention, when dissolved in water at a concentration of 0.6 wt. % form a homogeneous gel, and have an increase in dynamic viscosity of at least 6,000 cP in a 0.2 wt. % Borax aqueous solution, according to the Borate-Crosslinker Thickening Test, relative to the dynamic viscosity of the homogeneous gel with 0.0 wt. % Borax aqueous solution (i.e., in the absence of Borax crosslinker thickening agent), such as an increase in dynamic viscosity of at least 7,000 cP in a 0.2 wt. % Borax aqueous solution; at least 8,000 cP; at least 9,000 cP; at least 10,000 cP; at least 12,000 cP; at least 15,000 cP; at least 17,000 cP; at least 20,000 cP; at least 22,000 cP; at least 23,000 cP; or an increase in dynamic viscosity of at least 25,000 cP in a 0.2 wt. % Borax aqueous solution, according to the Borate-Crosslinker Thickening Test, relative to the dynamic viscosity of the homogeneous gel with 0.0 wt. % Borax aqueous solution. For example, in certain embodiments, the star macromolecule composition of the present invention, when dissolved in water at a concentration of 0.6 wt. % form a homogeneous gel, and have an increase in dynamic viscosity in the range of between 5,000 cP to 30,000 cP in a 0.2 wt. % Borax aqueous solution, according to the Borate-Crosslinker Thickening Test, relative to the dynamic viscosity of the homogeneous gel with 0.0 wt. % Borax aqueous solution (i.e., in the absence of Borax crosslinker thickening agent), such as an increase in dynamic viscosity in the range of between 5,000 cP to 28,000 cP in a 0.2 wt. % Borax aqueous solution; in the range of between 5,000 cP to 26,000 cP; between 5,000 cP to 25,000 cP; between 5,000 cP to 20,000 cP; between 5,000 cP to 15,000 cP; between 5,000 cP to 14,000 cP; between 5,000 cP to 12,000 cP; between 5,000 cP to 10,000 cP; between 5,000 cP to 8,000 cP; between 7,000 cP to 30,000 cP; between 7,000 cP to 25,000 cP; between 7,000 cP to 20,000 cP; between 7,000 cP to 15,000 cP; between 10,000 cP to 15,000 cP; between 10,000 cP to 20,000 cP; between 10,000 cP to 25,000 cP; between 15,000 cP to 30,000 cP; between 20,000 cP to 25,000 cP; or an increase in dynamic viscosity between 25,000 cP to 30,000 cP in a 0.2 wt. % Borax aqueous solution, according to the Borate-Crosslinker Thickening Test, relative to the dynamic viscosity of the homogeneous gel with 0.0 wt. % Borax aqueous solution.

In certain embodiments, the star macromolecule composition of the present invention, when dissolved in water at a concentration of 0.6 wt. % form a homogeneous gel, and have a positive % increase in dynamic viscosity of at least 10% in a 0.2 wt. % Borax aqueous solution, according to the Borate-Crosslinker Thickening Test, relative to the dynamic viscosity of the homogeneous gel with 0.0 wt. % Borax aqueous solution (i.e., in the absence of Borax crosslinker thickening agent). For example, in certain embodiments, the star macromolecule composition of the present invention, when dissolved in water at a concentration of 0.6 wt. % form a homogeneous gel, and have a positive % increase in dynamic viscosity of at least 12% in a 0.2 wt. % Borax aqueous solution, according to the Borate-Crosslinker Thickening Test, relative to the dynamic viscosity of the homogeneous gel with 0.0 wt. % Borax aqueous solution (i.e., in the absence of Borax crosslinker thickening agent), such as a positive % increase in dynamic viscosity of at least 13% in a 0.2 wt. % Borax aqueous solution; at least 14%; at least 15%; at least 16%; at least 17%; at least 18%; at least 20%; at least 22%; at least 23%; at least 24%; or a positive % increase in dynamic viscosity of at least 25% in a 0.2 wt. % Borax aqueous solution, according to the Borate-Crosslinker Thickening Test, relative to the dynamic viscosity of the homogeneous gel with 0.0 wt. % Borax aqueous solution. For example, in certain embodiments, the star macromolecule composition of the present invention, when dissolved in water at a concentration of 0.6 wt. % form a homogeneous gel, and have a positive % increase in dynamic viscosity in the range of between 10% to 30% in a 0.2 wt. % Borax aqueous solution, according to the Borate-Crosslinker Thickening Test, relative to the dynamic viscosity of the homogeneous gel with 0.0 wt. % Borax aqueous solution (i.e., in the absence of Borax crosslinker thickening agent), such as an increase in dynamic viscosity in the range of between 10% to 25% in a 0.2 wt. % Borax aqueous solution; in the range of between 10% to 20%; between 10% to 15%; between 10% to 13%; between 15% to 30%; between 15% to 25%; between 15% to 20%; between 20% to 30%; between 20% to 25%; or an increase in dynamic viscosity between 25% to 30% in a 0.2 wt. % Borax aqueous solution, according to the Borate-Crosslinker Thickening Test, relative to the dynamic viscosity of the homogeneous gel with 0.0 wt. % Borax aqueous solution.

Suitable star macromolecules may include, but are not limited to, a mikto star macromolecule, a water-soluble star macromolecule, a gel-forming star macromolecule, thickening agent star macromolecules, hydraulic fracturing fluid thickening star macromolecules, hydraulic fracturing fluid gelling star macromolecules, or combinations thereof. In certain embodiments, the star macromolecule may have a molecular weight of greater than 100,000 g/mol, for example, between 100,000 g/mol and 5,000,000 g/mol, such as between 100,000 g/mol and 4,000,000 g/mol; between 100,000 g/mol and 3,000,000 g/mol; between 100,000 g/mol and 2,000,000 g/mol; between 125,000 g/mol and 1,750,000 g/mol; between 150,000 g/mol and 1,750,000 g/mol; between 200,000 g/mol and 1,500,000 g/mol; between 225,000 g/mol and 1,250,000 g/mol; between 125,000 g/mol and 1,000,000 g/mol; between 125,000 g/mol and 900,000 g/mol; between 125,000 g/mol and 800,000 g/mol; between 125,000 g/mol and 700,000 g/mol; between 150,000 g/mol and 650,000 g/mol; between 200,000 g/mol and 600,000 g/mol; between 225,000 g/mol and 650,000 g/mol; between 250,000 g/mol and 550,000 g/mol; between 350,000 g/mol and 500,000 g/mol; between 300,000 g/mol and 500,000 g/mol; or between 350,000 g/mol and 750,000 g/mol.

Suitable star macromolecules may have a polydispersity index (PDI) of 8.0 or less, for example, a PDI of 7.0 or less, such as 6.0 or less; 5.0 or less; 4.0 or less; 3.0 or less; 2.5 or less; 2.0 or less; or a PDI of 1.7 or less. For example, a star macromolecule may have a PDI of between 1.0 to 8.0, such as between 1.0 and 8.0; between 1.0 and 7.0; between 1.0 and 6.0; between 1.0 and 5.0; between 1.0 and 4.0; between 1.0 and 3.0; between 1.0 and 2.5; between 2.0 and 8.0; between 2.0 and 5.0; between 2.5 and 7.0; between 3.0 and 7.5; between 3.5 and 6.0; between 1.0 and 2.3; between 1.0 and 2.0; between 1.0 and 1.9; between 1.0 and 1.8; between 1.0 and 1.7; between 1.0 and 1.6; between 1.0 and 1.5; between 1.0 and 1.4; between 1.0 and 1.3; between 1.0 and 1.2; between 1.0 and 1.1; between 1.05 and 1.75; between 1.1 and 1.7; between 1.15 and 1.65; or between 1.15 and 1.55.

Suitable star macromolecules may comprise arms that are of the same type or a different type and are homopolymeric, copolymeric (sometimes designated by "-co-"), comprise multiple block segment, random segments, gradient segments and or no particular segments. In certain embodiments, the star macromolecule may comprise, for example, one or more arm-types, such as, two or more, three or more, four or more, or five or more arm-types. Suitable arm types may include, but are not limited to, homopolymeric arms, copolymeric arms, such as random copolymeric arms or block copolymeric arms, or combinations thereof. For example, a star macromolecule may comprise homopolymeric arms and copolymeric arms, such as block copolymeric arms. Suitable arm types may also include, but are not limited to, hydrophilic arms, hydrophobic arms, or amphiphilic arms. In certain embodiments, a star macromolecule arm may comprise hydrophilic polymeric segments comprising hydrophilic monomeric residues, hydroxyl-containing polymeric segments comprising hydroxyl-containing monomeric residues, hydrophobic polymeric segments comprising hydrophobic monomeric residues, amphiphilic polymeric segments comprising amphiphilic monomeric residues, or combinations thereof. For example, in certain embodiments, a star macromolecule may comprise homopolymeric arms and copolymeric arms, such as hydrophilic homopolymeric arms, copolymeric arms comprising hydrophilic polymeric segments and hydroxyl-containing polymeric segments, and copolymeric arms comprising hydrophilic polymeric segments and hydrophobic polymeric segments. In certain embodiments, a star macromolecule may comprise polymeric arms comprising predominantly hydrophilic polymeric segments, and one or more different copolymeric arms, such as two or more different copolymeric arms, comprising a first copolymeric arm comprising a hydrophilic polymeric segment and a predominantly hydroxyl-containing polymeric segment, and a second copolymeric arm comprising a hydrophilic polymeric segment and a predominantly hydrophobic polymeric segment.

Suitable star macromolecules may also comprise arms that are covalently linked to the core of the star macromolecule. In certain embodiments, the arms of a star macromolecule may be covalently linked to the core of the star macromolecule via crosslinking, such as crosslinking with a crosslinker, for example, a hydrophobic difunctional crosslinker or a hydrophilic difunctional crosslinker. For example, arms of a star macromolecule, such as homopolymeric arms and block copolymeric arms of a mikto star macromolecule, may be covalently linked together to form a core by crosslinking an end of the arms with a crosslinker, such as with a hydrophobic difunctional crosslinker or a hydrophilic difunctional crosslinker. For example, arms of a star macromolecule, such as hydrophilic polymeric arms and copolymeric arms (block or random, or containing both block and random copolymeric segments) of a mikto star macromolecule, may be covalently linked together to form a core by crosslinking an end of the arms with a crosslinker, such as with a hydrophobic difunctional crosslinker or a hydrophilic difunctional crosslinker.

Suitable star macromolecules may also comprise arms of varying length and/or degree of polymerization. In certain embodiments, for example, a star macromolecule may comprise homopolymeric arms and block copolymeric arms, wherein the homopolymeric arms of a shorter length and/or a lesser degree of polymerization in relation to the block copolymeric arms. In certain embodiments, for example, a star macromolecule may comprise a hydrophilic polymeric arms and one or more different copolymeric arms, wherein the hydrophilic polymeric arms are of a shorter length and/or a lesser degree of polymerization in relation to the one or more different copolymeric arms. In certain embodiments, for example, a star macromolecule may comprise homopolymeric arms and block copolymeric arms, wherein the block copolymeric arms of a longer length and/or a greater degree of polymerization in relation to the homopolymeric arms. In certain embodiments, a star macromolecule may comprise hydrophilic homopolymeric arms and block copolymeric arms, comprising (i) hydrophobic polymeric segments distal to the star core and hydrophilic polymeric segments that are proximal to the core of the star, wherein a distal portion of the hydrophilic polymeric segments of the copolymeric arm extends beyond a distal portion of the hydrophilic homopolymeric arms, and (ii) hydroxyl-containing polymeric segments distal to the star core and hydrophilic polymeric segments that are proximal to the core of the star, wherein a distal portion of the hydrophilic polymeric segments of the copolymeric arm extends beyond a distal portion of the hydrophilic homopolymeric arms. For example, a star macromolecule may comprise hydrophilic homopolymeric arms comprising polymerized hydrophilic monomeric residues and block copolymeric arms comprising (i) hydrophobic polymeric segments distal to the core of the star and hydrophilic polymeric segments that are proximal to the core of the star, wherein the distal hydrophobic polymeric segments extend beyond the most distal portion, in relation to the core, of the hydrophilic homopolymeric arms, and/or wherein a distal portion of the proximal hydrophilic polymeric segments of the copolymeric arm extend beyond the most distal portion, in relation to the core, of the hydrophilic homopolymeric arms, (ii) hydroxyl-containing polymeric segments distal to the core of the star and hydrophilic polymeric segments that are proximal to the core of the star, wherein the distal hydroxyl-containing polymeric segments extend beyond the most distal portion, in relation to the core, of the hydrophilic homopolymeric arms, and/or wherein a distal portion of the proximal hydrophilic polymeric segments of the copolymeric arm extend beyond the most distal portion, in relation to the core, of the hydrophilic homopolymeric arms. In certain embodiments, a star macromolecule may comprise hydrophilic homopolymeric arms and block copolymeric arms, comprising (i) hydrophobic polymeric segments distal to the star core and hydrophilic polymeric segments that are proximal to the star core, wherein the degree of polymerization of the hydrophilic polymeric segments of the copolymeric arms are greater than, for example, 20% greater than, such as between 30% to 300% greater than, between 40% to 250%, between 50% to 200%, or between 75% to 250% greater than, the degree of polymerization of the hydrophilic homopolymeric arms, such that a distal portion of the hydrophilic polymeric segments of the copolymeric arm extends beyond the a distal portion of the hydrophilic homopolymeric arms, and (ii) hydroxyl-containing polymeric segments distal to the star core and hydrophilic polymeric segments that are proximal to the star core, wherein the degree of polymerization of the hydrophilic polymeric segments of the copolymeric arms are greater than, for example, 20% greater than, such as between 30% to 300% greater than, between 40% to 250%, between 50% to 200%, or between 75% to 250% greater than, the degree of polymerization of the hydrophilic homopolymeric arms, such that a distal portion of the hydrophilic polymeric segments of the copolymeric arms extends beyond the a distal portion of the hydrophilic homopolymeric arms.

In certain embodiments, a star macromolecule may comprise hydrophilic homopolymeric arms comprising polymerized hydrophilic monomeric residues and block copolymeric arms comprising (i) hydrophobic polymeric segments distal to the core of the star and hydrophilic polymeric segments proximal to the core of the star, (ii) hydroxyl-containing polymeric segments distal to the core of the star and hydrophilic polymeric segments proximal to the core of the star, wherein the polymerized hydrophilic monomeric residues of the homopolymeric arm and the hydrophilic polymeric segments of the copolymeric arms may be derived from the same hydrophilic monomers, and may have the same or different degree of polymerization, for example, a degree of polymerization of between 50 to 500 monomeric residues, such as, between 50 to 400 monomeric residues; between 50 to 300 monomeric residues; between 50 to 200 monomeric residues; between 100 to 250 monomeric residues; between 125 to 175 monomeric residues; or between 150 to 300 monomeric residues. For example, a star macromolecule may comprise hydrophilic homopolymeric arms comprising polymerized hydrophilic monomeric residues and block copolymeric arms comprising (i) hydrophobic polymeric segments distal to the core of the star and hydrophilic polymeric segments proximal to the core of the star, (ii) hydroxyl-containing polymeric segments distal to the core of the star and hydrophilic polymeric segments proximal to the core of the star, wherein the polymerized hydrophilic monomeric residues of the homopolymeric arm and the hydrophilic polymeric segments of the copolymeric arms may be derived from the same hydrophilic monomers, and may have the same degree of polymerization, and wherein the hydrophobic polymeric segments of the copolymeric arms may have a degree of polymerization of between 1 to 60 monomeric residues, such as between 1 to 50 monomeric residues; between 1 to 45 monomeric residues; between 5 to 40 monomeric residues; between 8 to 35 monomeric residues; between 10 to 30 monomeric residues; between 12 to 25 monomeric residues; between 14 to 20 monomeric residues; between 15 to 30 monomeric residues; or between 5 to 20 monomeric residues.

Suitable star macromolecules may have a wide range of total number of arms, for example, a star macromolecule may comprise greater than 3 arms. For example, a suitable star macromolecule may comprise between 3 and 1000 arms, such as between 3 and 800 arms; between 3 and 500 arms; between 5 and 650 arms; between 5 and 500 arms; between 50 and 250 arms; between 100 and 900 arms; between 250 and 750 arms; between 500 and 1000 arms; between 15 and 100 arms; between 15 and 90 arms; between 15 and 80 arms; between 15 and 70 arms; between 15 and 60 arms; between 15 and 50 arms; between 20 and 50 arms; between 25 and 45 arms; between 25 and 35 arms; between 30 and 45 arms; or between 30 and 50 arms.

Suitable star macromolecules may have more than one arm type, such as two or more different arm types, or three or more different arm types, where in a molar ratio of the different arm types may be between 40:1 and 1:40, such as between 40:1 and 1:1; between 30:1 and 1:1; between 20:1 and 1:1; between 15:1 and 1:1; between 10:1 and 1:1; between 5:1 to 3:1; between 8:1 to 1:8; between 7:1 to 1:10; between 5:1 to 1:20; between 10:1 to 1:30; between 1:1 to 1:25; between 20:1 to 1:20; or between 3:1 to 1:8. For example, a star macromolecule comprising two different arm types, such as a homopolymeric arm, for example, a hydrophilic homopolymeric arm, and a copolymeric arm, for example, a copolymeric arm comprising hydrophilic polymeric segments and hydrophobic polymeric segments, may have a molar ratio of the two different arm types between 40:1 to 1:40, such as between 40:1 to 2:1; between 30:1 to 2:1; between 20:1 to 2:1; between 15:1 to 2:1; between 10:1 to 2:1; between 9:1 to 2:1; between 8:1 to 2:1; between 7:1 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 5:1 to 3:1; between 8:1 to 1:8; between 7:1 to 1:10; between 5:1 to 1:20; between 10:1 to 1:30; between 1:1 to 1:25; between 20:1 to 1:20; or between 3:1 to 1:8, and a copolymeric arm comprising hydrophilic polymeric segments and hydroxyl-containing polymeric segments, may have a molar ratio of the two different arm types between 40:1 to 1:40, such as between 40:1 to 2:1; between 30:1 to 2:1; between 20:1 to 2:1; between 15:1 to 2:1; between 10:1 to 2:1; between 9:1 to 2:1; between 8:1 to 2:1; between 7:1 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 5:1 to 3:1; between 8:1 to 1:8; between 7:1 to 1:10; between 5:1 to 1:20; between 10:1 to 1:30; between 1:1 to 1:25; between 20:1 to 1:20; or between 3:1 to 1:8.

Suitable star macromolecules may include, but is not limited to, comprising arms having a molecular weight of greater than 10,000 g/mol. For example, a star macromolecule may comprise arms having a molecular weight of between 10,000 g/mol and 500,000 g/mol, such as between 10,000 g/mol and 400,000 g/mol; between 10,000 g/mol and 300,000 g/mol; between 10,000 g/mol and 200,000 g/mol; between 10,000 g/mol and 175,000 g/mol; between 10,000 g/mol and 150,000 g/mol; between 10,000 g/mol and 125,000 g/mol; between 10,000 g/mol and 100,000 g/mol; between 10,000 g/mol and 90,000 g/mol; between 10,000 g/mol and 80,000 g/mol; between 10,000 g/mol and 70,000 g/mol; between 60,000 g/mol and 50,000 g/mol; between 10,000 g/mol and 40,000 g/mol; between 10,000 g/mol and 30,000 g/mol; between 10,000 g/mol and 20,000 g/mol; between 20,000 g/mol and 175,000 g/mol; between 20,000 g/mol and 100,000 g/mol; between 20,000 g/mol and 75,000 g/mol; between 20,000 g/mol and 50,000 g/mol; between 15,000 g/mol and 45,000 g/mol; between 50,000 g/mol and 350,000 g/mol; between 100,000 g/mol and 250,000 g/mol; between 75,000 g/mol and 300,000 g/mol; or between 15,000 g/mol and 30,000 g/mol.

Suitable arms of a star macromolecule may include, but is not limited to, arms having an HLB value of at least 17 (wherein the HLB is calculated per the formula set forth in the test procedures). For example, suitable arms of a star macromolecule may have an HLB value of greater than 17.25, such as greater than 18.5; at least 19; between 17.5 to 20; between 17.5 to 19.5; between 18 to 20; between 18.5 to 20; between 19 to 20; between 19.5 to 20; between 18 to 19.5; between 18.5 to 19.75; between 18.2 to 19.2; or between 18.75 to 19.5.

Suitable hydrophobic polymeric segments of a copolymeric arm of a star macromolecule may include, but is not limited to, hydrophobic polymeric segments having an HLB value of less than 8. For example, suitable hydrophobic polymeric segments may have an HLB value of less than 7, such as less than 6; less than 5; less than 4; less than 3; less than 2; or about 1.

Suitable arms of a star macromolecule may include, but is not limited to, arms having a polydispersity index (PDI) value of less than 4.0. For example, suitable arms of a star macromolecule may have PDI value of less than 3.5, such as less than 3.0; less than 2.75; less than 2.5; less than 2.25; less than 2.0; or less than 1.7. For example, suitable arms of a star macromolecule may have PDI value of between 1.0 to 4.0, such as 1.0 to 3.5; between 1.0 to 3.0; between 1.0 to 2.5; between 1.0 and 2.3; between 1.0 and 2.0; between 1.0 and 1.9; between 1.0 and 1.8; between 1.0 and 1.7; between 1.0 and 1.6; between 1.0 and 1.5; between 1.0 and 1.4; between 1.0 and 1.3; between 1.0 and 1.2; between 1.0 and 1.1; between 1.05 and 1.75; between 1.1 and 1.7; between 1.4 and 1.8; between 1.3 and 1.6; between 1.6 and 2.0; between 1.15 and 1.65; or between 1.15 and 1.55.

Suitable cores of a star macromolecule may be formed by or derived from, but is not limited to, crosslinking of a plurality of arms and a crosslinker. For example, a core may be formed by or derived from crosslinking of a plurality of homopolymeric arms and a plurality of copolymeric arms with a crosslinker, such as a multifunctional monomer crosslinker, for example, a hydrophobic difunctional monomer crosslinker. In certain embodiments, the core may be formed or derived from crosslinking a plurality of hydrophilic homopolymeric arms and a first plurality of copolymeric arms, comprising block hydrophilic polymeric segments and block hydrophobic polymeric segments, and a second plurality of copolymeric arms, comprising block hydrophilic polymeric segments and block hydroxyl-containing polymeric segments, with a crosslinker, such as a hydrophobic difunctional monomer crosslinker, for example divinylbenzene, wherein the molar ratio of the homopolymeric arms to the first copolymeric arms may be between 40:1 to 1:40, such as between 40:1 to 2:1; between 30:1 to 2:1; between 20:1 to 2:1, between 15:1 to 2:1; between 10:1 to 2:1; between 9:1 to 2:1; between 8:1 to 2:1; between 7:1 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 5:1 to 3:1; between 8:1 to 1:8; between 7:1 to 1:10; between 5:1 to 1:20; between 10:1 to 1:30; between 1:1 to 1:25; between 20:1 to 1:20; or between 3:1 to 1:8, and the molar ratio of the homopolymeric arms to the second copolymeric arms may be between 40:1 to 1:40, such as between 40:1 to 2:1; between 30:1 to 2:1; between 20:1 to 2:1, between 15:1 to 2:1; between 10:1 to 2:1; between 9:1 to 2:1; between 8:1 to 2:1; between 7:1 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 5:1 to 3:1; between 8:1 to 1:8; between 7:1 to 1:10; between 5:1 to 1:20; between 10:1 to 1:30; between 1:1 to 1:25; between 20:1 to 1:20; or between 3:1 to 1:8.

Suitable star macromolecules may include, but is not limited to, comprising a core having a molecular weight of greater than 3,000 g/mol. For example, a star macromolecule may comprise a core having a molecular weight of between 3,000 g/mol and 90,000 g/mol, such as between 3,000 g/mol and 45,000 g/mol; between 3,000 g/mol and 40,000 g/mol; between 3,000 g/mol and 30,000 g/mol; between 3,000 g/mol and 20,000 g/mol; between 3,000 g/mol and 15,000 g/mol; between 5,000 g/mol and 40,000 g/mol; between 6,000 g/mol and 30,000 g/mol; between 7,000 g/mol and 25,000 g/mol; between 8,000 g/mol and 20,000 g/mol; between 5,000 g/mol and 15,000 g/mol; between 7,000 g/mol and 12,000 g/mol; between 5,000 g/mol and 9,000 g/mol; between 8,000 g/mol and 10,000 g/mol; or between 9,000 g/mol and 15,000 g/mol.

Suitable star macromolecules may be used to form a clear, homogeneous gel when dissolved in water at a concentration of at least 0.05 wt. % at a pH of about 7.5 at STP. For example, a star macromolecule may form a clear, homogeneous gel when dissolved in water at a concentration of between 0.05 wt % to 3 wt %, such as between 0.1 wt. % to 2.5 wt. %; between 0.1 wt. % to 2 wt. %; between 0.2 wt. % to 2.0 wt. %; between 0.2 wt. % to 1.5 wt. %; between 0.2 wt. % to 1.0 wt. %; between 0.2 wt. % to 2.5 wt. %; between 0.3 wt. % to 2.5 wt. %; between 0.4 wt. % to 2.0 wt. %; between 0.5 wt. % to 2.0 wt. %; between 0.6 wt. % to 2.0 wt. %; between 0.7 wt. % to 1.5 wt. %; between 0.8 wt. % to 1.2 wt. %; between 0.9 wt. % to 1.1 wt. %; between 0.5 wt. % to 2.5 wt. %; between 0.75 wt. % to 1.5 wt. %; or between 0.8 wt. % to 1.6 wt. %.

Suitable star macromolecules, in accordance with the pH Efficiency Range Test Procedure described below herein, may be used to form a clear, homogeneous gel, wherein the star macromolecule at a concentration of 0.4 wt. %, may have a viscosity of at least 20,000 cP, at a pH of between about 4 to about 12, for example, at a pH of between about 5 to about 11.5 such as at a pH of between about 5 to about 11; between about 5 to about 10.5; between about 5 to about 10; between about 5 to about 9.5; between about 5 to about 9; between about 5 to about 8.5; between about 5 to about 8; between about 6 to about 11; between about 5.5 to about 10; between about 6 to about 9; between about 6.5 to about 8.5; between about 7 to about 8; between about 7.5 to about 8.5; or between about 6.5 to about 7.5.

In certain embodiments, for example, suitable star macromolecules, in accordance with the pH Efficiency Range Test Procedure described below herein, may be used to form a clear, homogeneous gel, wherein the star macromolecule at a concentration of 0.4 wt. %, may have a viscosity of at least 20,000 cP at a pH between about 5.5 to about 11. For example, at a pH between about 5.5 to about 11 may have a viscosity of at least 30,000 cP, such as, at least 40,000 cP; between 20,000 cP to 250,000 cP; between 20,000 cP to 250,000 cP; between 20,000 cP to 225,000 cP; between 20,000 cP to 200,000 cP; between 20,000 cP to 175,000 cP; between 20,000 cP to 150,000 cP; between 20,000 cP to 125,000 cP; between 30,000 cP to 250,000 cP; between 30,000 cP to 200,000 cP; between 40,000 cP to 175,000 cP; or between 40,000 cP to 150,000 cP. For example, a gel at a pH between about 6 to about 11 may have a viscosity of at least 20,000 cP, such as, at least 30,000 cP; at least 40,000 cP; between 20,000 cP to 250,000 cP; between 20,000 cP to 250,000 cP; between 20,000 cP to 225,000 cP; between 20,000 cP to 200,000 cP; between 20,000 cP to 175,000 cP; between 20,000 cP to 150,000 cP; between 20,000 cP to 125,000 cP; between 30,000 cP to 250,000 cP; between 30,000 cP to 200,000 cP; between 40,000 cP to 175,000 cP; or between 40,000 cP to 150,000 cP. For example, at a pH between about 7 to about 10.5 may have a viscosity of at least 60,000 cP, such as at least 70,000 cP; between 60,000 cP to 250,000 cP; between 60,000 cP to 225,000 cP; between 60,000 cP to 200,000 cP; between 60,000 cP to 175,000 cP; between 60,000 cP to 150,000 cP; between 60,000 cP to 125,000 cP; between 60,000 cP to 115,000 cP; between 60,000 cP to 105,000 cP; or between 60,000 cP to 100,000 cP. For example, at a pH between about 4.5 to about 9.0 may have a viscosity of at least 95,000 cP, such as at least 100,000 cP; between 95,000 cP to 250,000 cP; between 95,000 cP to 225,000 cP; between 95,000 cP to 200,000 cP; between 95,000 cP to 175,000 cP; between 95,000 cP to 150,000 cP; between 95,000 cP to 125,000 cP; between 95,000 cP to 115,000 cP; or between 95,000 cP to 105,000 cP.

Suitable star macromolecules, in accordance with the Dynamic Viscosity & Shear-Thinning Test Procedure described below herein, may be used to form a clear, homogeneous gel, wherein the star macromolecule at a concentration of 0.4 wt. %, may have a viscosity of less than 5,000 cP at a shear rate of 4 sec$^{-}$, such as a viscosity of less than 4,000 cP. For example, the star macromolecule at a concentration of 0.4 wt. %, may have a viscosity have a viscosity of less than 5,000 cP at a shear rate of 6 sec$^{-1}$, such as a viscosity of less than 4,000 cP or less than 3,000 cP. For example, a gel may have a viscosity of less than 15,000 cP at a shear rate of 0.7 sec$^{-1}$, such as a viscosity of less than 14,000 cP or less than 13,000 cP. Suitable gels may include, but is not limited to, gels having shear-thinning value of at least 5, such as a shear-thinning value of at least 6, or between 5 to 15, such as between 5 to 15; between 7 to 12; between 8 to 10; or between 6 to 13.

Suitable star macromolecules, in accordance with the Dynamic Viscosity & Shear-Thinning Test Procedure described below herein, include those that have a shear-thinning value of at least 6, such as a shear-thinning value of between 6 to 100, such as between 15 to 90; between 20 to 80; between 25 to 70; between 25 to 50; or between 30 to 40.

Suitable star macromolecules, in accordance with the Salt-Induced Break Test Procedure described below herein, include those that have a salt-induced break value of at least 50%, such as a salt-induced break value of between 65% to 100%, such as between 75% to 100%; between 80% to 95%; between 75% to 90%; between 50% to 85%; between 70% to 95%; or between 60% to 100%.

Suitable star macromolecules, in accordance with the pH Efficiency Range Test Procedure described below herein, include those that have a pH-induced break value of at least 15%, such as a pH-induced break value of between 15% to 100%, such as between 25% to 100%; between 30% to 95%; between 40% to 90%; between 50% to 85%; between 70% to 95%; between 80% to 97%; between 90% to 99%; between 95% to 100%; or between 60% to 100%.

Suitable star macromolecules, in accordance with the Dynamic Viscosity & Shear-Thinning Test Procedure described below herein, include those that have a dynamic viscosity value, of greater than 20,000 cP at 1 rpm, and at a concentration of 0.2 wt. %, such as a dynamic viscosity value of greater than 24,000 cP; greater than 28,000 cP; or greater than 30,000 cP at a concentration of 0.2 wt. %.

Suitable emulsions may include, but is not limited to, emulsions that are emulsifier-free and wherein the emulsion is thickened by a star macromolecule. For example, the star macromolecule that may be included in the emulsifier-free emulsion may be a water-soluble star macromolecule, wherein the water-soluble star macromolecule emulsifies the emulsifier-free emulsion.

Suitable star macromolecules, include star macromolecules that have an emulsion value of greater than 60 minutes, for example, greater than 3 hours, such as greater than 6 hours; greater than 10 hours; greater than 20 hours; greater than 40 hours; or greater than 100 hours.

The term "star macromolecule composition" is understood to mean a composition comprising at least one star macromolecule as defined by Formula (I), of the total star macromolecules in the composition, for example, comprising predominantly star macromolecules as defined by Formula (I); such as comprising substantially star macromolecules as defined by Formula (I); comprising mostly star macromolecules as defined by Formula (I). For example, the star macromolecule composition may comprise in the range of between 0.001 wt. % to 100 wt. % of the star macromolecule as defined by Formula (I), of the total star macromolecules in the composition, such as in the range of between 0.01 wt % to 10 wt. %; between 0.1 wt. % to 5 wt. %; between 0.01 wt. % to 3 wt. %; between 0.001 wt. % to 1 wt. %; between 0.01 wt. % to 1.5 wt. %; or between 0.1 wt. % to 4.0 wt. %; of the total star macromolecules in the composition. For example, the star macromolecule composition may comprise predominantly star macromolecules having a molecular weight within 5%, for example, within 4%, 3%, 2% or 1%, of the molecular weight of the predetermined star macromolecule represented by Formula (I), relative to the total star macromolecules in the composition, wherein the PDI of the star macromolecules is in the range of between 1.0-8.0, for example, the star macromolecule as defined by Formula (I) has a PDI in the range of between 1.0 and 7.0; such as between 1.0 and 6.0; between 1.0 and 5.0; between 1.0 and 4.0; between 1.0 and 3.0; between 1.0 and 2.0; between 2.0 and 8.0; between 3.0 and 7.0; between 2.0 and 5.0; between 3.0 and 6.0; between 3.5 and 7.5; between 1.5 and 2.0; or between 1.5 and 2.5; and wherein each arm of the star macromolecule independently has a PDI in the range of between 1.0-4.0, for example, each arm of the star macromolecule, as defined by Formula (I), independently has a PDI in the range of between 1.0 and 3.5; such as between 1.0 and 3.0; between 1.0 and 2.5; between 1.0 and 2.0; between 2.0 and 3.5; between 1.0 and 1.75; between 1.0 and 1.5; between 1.5 and 2.0; or between 1.5 and 2.5. In certain embodiments, the star macromolecule composition of the present invention comprises at least one star macromolecule as defined by Formula (I) that results from the preparation of one or more star macromolecule processes as described herein, such as by the one-pot process, the arm first process, ATRP, CRP, RAFT, TEMPO, Nitroxide, LRP, CRP, anionic polymerization, cationic polymerization, or combinations thereof.

Suitable star macromolecules, according to Formula (I), may include star macromolecules wherein, for example, P1 comprises hydrophobic monomers, P2 comprises hydrophilic monomers, P3 comprises hydrophilic monomers, P4 comprises hydroxyl-containing monomers, and P5 comprises hydrophilic monomers. For example, star macromolecules, according to Formula (I), may include star macromolecules wherein q1 and q4 may have a value of between 1 to 100, for example, between 1 to 60, such as, between 1 to 45; between 5 to 40; between 8 to 35; between 10 to 30; between 12 to 25; between 14 to 20; between 15 to 30; or between 5 to 20; and q2, q3 and/or q5 have a value of between 50 to 500, for example, between 50 to 400, such as, between 50 to 300; between 50 to 200; between 100 to 250; between 125 to 175; or between 150 to 300. For example, star macromolecules, according to Formula (I), may include star macromolecules wherein r, s, or t, or the sum of r and t, or the sum of s and t, may be greater than 3, such as between 3 and 1000 arms, such as between 3 and 800 arms; between 3 and 500 arms; between 5 and 650 arms; between 5 and 500 arms; between 50 and 250 arms; between 100 and 900 arms; between 250 and 750 arms; between 500 and 1000 arms; between 15 and 100; between 15 and 90; between 15 and 80; between 15 and 70; between 15 and 60; between 15 and 50; between 20 and 50; between 25 and 45; between 25 and 35; between 30 and 45; or between 30 and 50. For example, star macromolecules, according to Formula (I), may include star macromolecules wherein the molar ratio of r to s may be in the range of between 40:1 to 1:40, and when t is at least 1: the molar ratio of r to t may be in the range of between 40:1 to 1:40, or the molar ratio of t to s may be in the range of between 40:1 to 1:40, or combinations thereof. For example, the molar ratio of r to s, is in the range of between 40:1 to 1:40, such as between 40:1 to 2:1; between 30:1 to 2:1; between 20:1 to 2:1; between 15:1 to 2:1; between 10:1 to 2:1; between 9:1 to 2:1; between 8:1 to 2:1; between 7:1 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 5:1 to 3:1; between 8:1 to 1:8; between 7:1 to 1:10; between 5:1 to 1:20; between 10:1 to 1:30; between 1:1 to 1:25; between 20:1 to 1:20; or between 3:1 to 1:8. For example, when t is at least 1, the molar ratio of r to t, is in the range of between 40:1 to 1:40, such as between 30:1 to 2:1; between 20:1 to 2:1; between 15:1 to 2:1; between 10:1 to 2:1; between 9:1 to 2:1; between 8:1 to 2:1; between 7:1 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 5:1 to 3:1; between 8:1 to 1:8; between 7:1 to 1:10; between 5:1 to 1:20; between 10:1 to 1:30; between 1:1 to 1:25; between 20:1 to 1:20; or between 3:1 to 1:8. For example, when t is at least 1, the molar ratio of t to s, is in the range of between 40:1 to 1:40, such as between 30:1 to 2:1; between 20:1 to 2:1; between 15:1 to 2:1; between 10:1 to 2:1; between 9:1 to 2:1; between 8:1 to 2:1; between 7:1 to 2:1; between 6:1 to 2:1; between 5:1 to 2:1; between 4:1 to 2:1; between 3:1 to 2:1; between 2:1 to 1:1; between 8:1 to 3:1; between 7:1 to 2:1; between 5:1 to 3:1; between 8:1 to 1:8; between 7:1 to 1:10; between 5:1 to 1:20; between 10:1 to 1:30; between 1:1 to 1:25; between 20:1 to 1:20; or between 3:1 to 1:8.

In certain embodiments, star macromolecules according to Formula (I) may include star macromolecules wherein the core may be derived from crosslinker monomers, such as hydrophobic crosslinker monomers. For example, star macromolecules, according to Formula (I), may include star macromolecules wherein the core may comprise crosslinker monomeric residues, such as hydrophobic crosslinker monomeric residues. In certain embodiments, star macromolecules according to Formula (I), may include star macromolecules wherein the polymerized monomeric residues of P1, or P2, or both, of the $[(P1)_{q1}\text{-}(P2)_{q2}]_t$ arm may be homopolymeric or copolymeric, such as random copolymeric or block copolymeric, and wherein the polymerized monomeric residues of P4, or P5, or both, of the $[(P4)_{q4}\text{-}(P5)_{q5}]_s$ arm may be homopolymeric or copolymeric, such as random copolymeric or block copolymeric.

Suitable star macromolecules, may include, but is not limited to, star macromolecules formed by crosslinking the arms with a crosslinker, such as crosslinking homopolymeric arms and block copolymeric arms with a hydrophobic crosslinker. For example, the homopolymeric arms and the copolymeric arms of a star macromolecule may be covalently attached to the core via crosslinkage with a crosslinker. For example, a core of a prepared star macromolecule may be prepared by crosslinking an end of a homopolymeric arm with an end of a copolymeric arm, such as an end of a hydrophilic homopolymeric arm with a hydrophilic end of a copolymeric arm. For example, the core of a prepared star macromolecules may be formed by crosslinking an ATRP-functional terminal group end of a homopolymeric arm with an ATRP-functional terminal group end of a copolymeric arm.

Suitable initiators that may be used to form the star macromolecules disclosed herein, may include, but is not limited to, nitroxide initiators, such as stable nitroxide initiators, for example, 2,2,6,6-Tetramethylpiperidine-1-oxyl, sometimes called TEMPO; transition metal complexes, such cobalt containing complexes; ATRP initiators, comprising halides, such as, bromide, chloride, or iodide, and transition metal sources, such as, copper, iron, ruthenium transition metal sources; iodide with RCTP catalysts, such as germanium or tin catalysts; RAFT initiators, such as dithioesters, dithiocarbamates, or xanthates; ITP catalysts, comprising iodides; tellurium compounds (e.g., TERP); stibine compounds (e.g., SBRP); or bismuth compounds (e.g., BIRP). For example, in certain embodiments, an initiator may further comprise a monomeric residue, a polymeric segment comprising monomeric residues, or a small-molecule. For example, in certain embodiments, an initiator may comprise an ATRP initiator, wherein the ATRP initiator serves as a terminal functional group. For example, in certain embodiments, an initiator may comprise an ATRP-functional terminal group, comprising an ATRP initiator, such as halides and transition metal sources.

Although any conventional method can be used for the synthesis of the multi-arm star macromolecules of the invention, free radical polymerization is the preferred and living/controlled radical polymerization (CRP) is the most preferred process.

Star polymers are nano-scale materials with a globular shape and can be formed by the "arm first" procedure, can have a crosslinked core and can optionally possess multiple segmented arms of similar composition. Stars can be designed as homo-arm stars or mikto-arm stars.

Synthesis of star polymers of the invention can be accomplished by "living" polymerization techniques via one of three strategies: 1) core-first" which is accomplished by growing arms from a multifunctional initiator; 2) "coupling-onto" involving attaching preformed arms onto a multifunctional core and the 3) arm-first" method which involves cross-linking preformed linear arm precursors using a divinyl compound.

While all above controlled polymerization procedures are suitable for preparation of an embodiment of the disclosed self assembling star macromolecules. Other embodiments are also exemplified, for example, the preparation of the self assembling multi-arm stars with narrow MWD, in contrast to prior art using ATRP. The reason for the use of the Controlled Radical Polymerization process (CRP) known as ATRP; disclosed in U.S. Pat. Nos. 5,763,546; 5,807,937; 5,789,487; 5,945,491; 6,111,022; 6,121,371; 6,124,411: 6,162,882: and U.S. patent application Ser. Nos. 09/034,187; 09/018,554; 09/359,359; 09/359,591; 09/369,157; 09/126, 768 and 09/534,827, and discussed in numerous publications listed elsewhere with Matyjaszewski as co-author, which are hereby incorporated into this application, is that convenient procedures were described for the preparation of polymers displaying control over the polymer molecular weight, molecular weight distribution, composition, architecture, functionality and the preparation of molecular composites and tethered polymeric structures comprising radically (co)polymerizable monomers, and the preparation of controllable macromolecular structures under mild reaction conditions.

An aspect of the present invention relates to the preparation and use of multi-arm star macromolecules by an "arm first" approach, discussed by Gao, H.; Matyjaszewski, K. *JACS;* 2007, 129, 11828. The paper and cited references therein are hereby incorporated by reference to describe the fundamentals of the synthetic procedure. The supplemental information available within the cited reference provides a procedure for calculation of the number of arms in the formed star macromolecule.

It is expected that biphasic systems such as a mini-emulsion or an ab initio emulsion system would also be suitable for this procedure since mini-emulsion systems have been shown to function as dispersed bulk reactors [Min, K.; Gao, H.; Matyjaszewski, K. *Journal of the American Chemical Society* 2005, 127, 3825-3830] with the added advantage of minimizing core-core coupling reactions based on compartmentalization considerations.

In one embodiment star macromolecules are prepared with composition and molecular weight of each segment predetermined to perform as rheology modifiers in aqueous based solutions. The first formed segmented linear polymer chains are chain extended with a crosslinker forming a crosslinked core.

In another embodiment a one-pot industrially scalable process for the preparation of star macromolecules is provided wherein the arms comprise segments selected to induce self assembly and wherein the self assemblable star macromolecules are suitable for use as rheology control agents in waterborne and solvent-borne coatings, adhesives, and fracturing fluid compositions.

An embodiment of the present invention can be exemplified by the preparation of a multi-arm star macromolecule wherein the number of arms in the star macromolecule is between 5 and 1000, such as between 5 and 500, preferentially between 10 and 250, with segments selected to induce self assembly when the star macromolecule is dispersed in a liquid wherein the self assemblable star macromolecules are suitable for use as thickening agents or rheology modifiers in cosmetic and personal care compositions at low concentrations of the solid in the thickened solution, preferably less than 5 wt %, and optimally less than 1 wt %. The dispersion medium can comprise aqueous based systems or oil based systems.

Similar structures can also be prepared using the macromonomer method or a combination of the macromonomer and macroinitiator method in a controlled polymerization process, or even through free radical copolymerization conducted on macromonomers, as known to those skilled in the art. [Gao, H.; Matyjaszewski, K. *Chem.—Eur. J.* 2009, 15, 6107-6111.]

Both the macromonomer and macroinitiator procedures allow incorporation of polymer segments prepared by procedures other than CRP [WO 98/01480] into the final star macromolecule. Polymer segments can comprise segments that are bio-degradable of are formed from monomers prepared from biological sources.

As noted above the first formed ATRP macroinitiator can be prepared by conducting a sequential ATRP (co)polymerization of hydrophobic and hydrophilic monomers or precursors thereof or can be prepared by other polymerization procedures that provide a functional terminal atom or group that can be converted into an ATRP initiator with a bifunctional molecule wherein one functionality comprises a transferable atom or group and the other functionality an atom or group that can react with the functionality first present on the (co)polymer prepared by a non-ATRP procedure. [WO 98/01480]

In aqueous solutions, the composition and molecular weight of the outer shell of hydrophobes, or agents that participate in molecular recognition, can be selected to induce self-assembly into aggregates and act as physical crosslinkers. Above a certain concentration, corresponding to the formation of a reversible three dimensional network, the solutions will behave as physical gels thereby modifying the rheology of the solution.

In one embodiment, the polymer compositions of the invention have significantly lower critical concentration for network (gel) formation compared to networks formed with block copolymers, graft and stars with a low specific number of attached arms due to:

multi-arm structure (many transient junctions possible between hydrophobic parts of the stars)

very high molecular weight of each star (5 thousand to 5 million or higher) allows high swelling ratio of the molecules in solution molecular organization on larger scales (>1 μm)

Whereas the examples above and below describe the preparation and use of block copolymers as arms with a well defined transition from one segment to the adjoining segment a segmented copolymer with a gradient in composition can also be utilized. The presence of a gradient can be created by addition of a second monomer prior to consumption of the first monomer and will affect the volume fraction of monomer units present in the transition form one domain to another. This would affect the shear responsiveness of the formed star macromolecule.

Star macromolecules with narrow polydispersity comprising arms with block copolymer segments can be formed with as few as 5 arms by selecting appropriate concentration of reagents, crosslinker and reaction temperature.

Star macromolecules can be prepared in a mini-emulsion or reverse mini-emulsion polymerization system. The first formed block copolymers are used as reactive surfactants for star synthesis by reaction with a selected crosslinker in mini-emulsion.

In an embodiment, a star macromolecule may be represented by Formula Y:

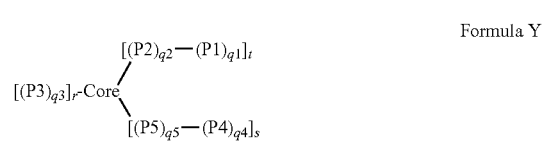

Formula Y wherein:

Core represents a crosslinked polymeric segment;

P1 represents a hydrophobic homopolymeric segment comprised of repeat units of monomeric residues of polymerized hydrophobic monomers;

P2 represents a hydrophilic homopolymeric segment comprised of repeat units of monomeric residues of polymerized hydrophilic monomers;

P3 represents a hydrophilic homopolymeric segment comprised of repeat units of monomeric residues of polymerized hydrophilic monomers;

P4 represents a hydroxyl-containing segment (homopolymeric or copolymeric) comprised of repeat units of monomeric residues, where at least one of the monomeric residues or a plurality of the monomeric residues is a hydroxyl-containing monomeric residue, of polymerized monomers;

P5 represents a hydrophilic homopolymeric segment comprised of repeat units of monomeric residues of polymerized hydrophilic monomers;

q1 represents the number of repeat units in P1 and has a value between 1 and 50;

q2 represents the number of repeat units in P2 and has a value between 30 and 2000;

q3 represents the number of repeat units in P3 and has a value between 30 and 2000;

q4 represents the number of repeat units in P4 and has a value between 1 and 50;

q5 represents the number of repeat units in P5 and has a value between 30 and 2000;

r represents the number of homopolymeric arms covalently attached to the Core;

s represents the number of hydroxyl-containing arms covalently attached to the Core; and t represents the number of copolymeric arms covalently attached to the Core; and wherein:

i) the molar ratio of r to t is in the range of between 40:1 and 2:1;

ii) the molar ratio of r to s is in the range of between 40:1 and 2:1;

iii) the molar ratio of t to s is in the range of between 40:1 and 1:40; or iv) combinations thereof.

In an embodiment, one or more star macromolecules may be represented by Formula Y, wherein the one or more star macromolecules may have a molecular weight of between 150,000 g/mol and 5,000,000 g/mol. In an embodiment, one or more star macromolecules may be represented by Formula Y, wherein the sum total number of arms (r+t) is between 15 and 45, or the sum total number of arms (s+t) is between 15 and 45, or both sum total number of arms (r+t) and sum total number of arms (s+t) are each between 15 and 45. In an embodiment, one or more star macromolecules may be represented by Formula Y, wherein the molar ratio of r to t is in the range of between 8:1 and 3:1, or the molar ratio of s to t is in the range of between 8:1 and 3:1, or both the molar ratio of r to t and the molar ratio of s to t are each in the range of between 8:1 and 3:1. In an embodiment, one or more star macromolecules may be represented by Formula Y, wherein i) both q2 and q3 have a value greater than 100, and q2 is greater than q3; or ii) both q5 and q3 have a value greater than 100, and q5 is greater than q3; or iii) both q2 and q3 have a value greater than 100, and q5 and q3 have a value greater than 100, and q2 and q5 are greater than q3. In an embodiment, one or more star macromolecules may be represented by Formula Y, wherein the arms represented by $[(P1)_{q1}\text{-}(P2)_{q2}]$ and $[(P4)_{q4}\text{-}(P5)_{q5}]$ have an HLB value greater than 18. In an embodiment, one or more star macromolecules may be represented by Formula Y, wherein the P1 homopolymeric segment is a hydrophobic homopolymeric segment having an HLB value of less than 8. In an embodiment, one or more star macromolecules may be represented by Formula Y, wherein the core comprises a hydrophobic crosslinked polymeric segment. In an embodiment, one or more star macromolecules may be represented by Formula Y, wherein the star macromolecule is a water soluble mikto star macromolecule. In an embodiment, one or more star macromolecules may be represented by Formula Y, wherein the star macromolecule, when dissolved in water at a concentration of at least 0.2 wt. %, forms a clear, homogeneous gel having a viscosity of at least 20,000 cP.

In an embodiment, a dual-mechanism thickening agent, comprising a star macromolecule represented by Formula Y having a molecular weight of between 150,000 g/mol and 5,000,000 g/mol that forms a homogeneous gel when dissolved in water at a concentration of at least 0.05 wt. %; wherein the gel has: i) a dynamic viscosity of at least 20,000 cP; ii) a salt-induced break value of at least 60%; iii) a shear-thinning value of at least 10; and/or iv) an emulsion value of greater than 12 hours. In an embodiment, the dual-mechanism thickening agent comprising a star macromolecules represented by Formula Y, wherein the gel-forming star macromolecule has a viscosity of greater than 40,000 cP at a pH between 6 to 11. In an embodiment, the dual-mechanism thickening agent comprising a star macromolecules represented by Formula Y, wherein the gel-forming star macromolecule has a viscosity of less than 5,000 cP at a shear rate of 4 sec$^{-1}$. In an embodiment, the dual-mechanism thickening agent comprising a star macromolecules represented by Formula Y, wherein the gel-forming star macromolecule has a PDI of less than 2.5. In an embodiment, the dual-mechanism thickening agent comprising a star macromolecules represented by Formula Y, wherein the gel-forming star macromolecule is a water-soluble mikto star macromolecule. In an embodiment, the dual-mechanism thickening agent comprising a star macromolecules represented by Formula Y, wherein the gel-forming star macromolecule has between 15 to 45 arms. In an embodiment, the dual-mechanism thickening agent comprising a star macromolecules represented by Formula Y, wherein the arms of the gel-forming star macromolecule comprise: i) hydrophilic homopolymeric arms; ii) copolymeric arms, comprising: a) hydrophilic polymeric segments and hydrophobic polymeric segments; and b) hydrophilic polymeric segments and hydroxyl-containing polymeric segments. In an embodiment, the dual-mechanism thickening agent comprising a star macromolecules represented by Formula Y, wherein the arms of the gel-forming star macromolecule have an HLB of between 18 and 20.

In an embodiment, a fracturing fluid composition may comprising at least 0.05 wt. % of a dual-mechanism thickening agent to improve water flooding during enhanced oil recovery, wherein the dual-mechanism thickening agent is a star macromolecule comprising: a) a molecular weight of greater than 100,000 g/mol; b) a core having a hydrophobic crosslinked polymeric segment; and c) a plurality of arms comprising at least three types of arms, wherein: i) a first-arm-type extends beyond a second-arm-type, and said first-arm-type has a hydrophobic segment on its distal end; and ii) a third-arm-type extends beyond a second-arm-type, and said third-arm-type has a hydroxyl-containing segment on its distal end; wherein the rheology-modifying composition has a shear-thinning value of at least 6. In an embodiment, the fracturing fluid composition may further comprise one or more boric acid additives or borate-type additives.

EXAMPLES

TABLE 1

| Abbreviation | Name | Form | Purity | Commercial Source |
|---|---|---|---|---|
| MeCN | Acetonitrile | liquid | 99.8% | Sigma Aldrich |
| AA | acrylic acid (formed by deprotection) | NA | NA | NA |
|  | Anisole | liquid | 99% | Sigma Aldrich |
| AIBN | 2,2'-Azobis(2-methylpropionitrile) | solid | 98% | Sigma Aldrich |
| V-70 | 2,2'-azobis(4-methoxy-2,4-dimethyl valeronitrile) | solid | 99% | Wako |
|  | Borax Anhydrous | solid | 98% | Sigma Aldrich |
| DEBMM | diethyl 2-bromo-2-methylmalonate | liquid | 98% | Sigma Aldrich |
| DMF | Diethylformamide | liquid | 98% | Sigma Aldrich |
| DVB | Divinylbenzene | liquid | 80% | Sigma Aldrich |
| EBiB | Ethyl α-bromoisobutyrate | liquid | 98% | Sigma Aldrich |
| FA | formic acid | liquid | 99% | Sigma Aldrich |
| GMA | Glycerol monomethacrylate | liquid | 99% | Monomer-Polymer & Dajac Labs |
| HCl | hydrochloric acid | liquid | 37% | Sigma Aldrich |
| MMA | methyl methacrylate | liquid | 99% | Sigma Aldrich |
| NaCl | Sodium chloride | solid | 99.7% | Fisher Chemical |
| NaOH | sodium hydroxide | solid | 98% | Sigma Aldrich |
| St | Styrene | liquid | 99% | Sigma Aldrich |
| tBA | tert-butyl acrylate | liquid | 98% | Sigma Aldrich |
| THF | Tetrahydrofuran | liquid | 99.9% | Sigma Aldrich |
| Sn(EH)$_2$ | tin(II) 2-ethylhexanoate | liquid | 95% | Sigma Aldrich |
| TPMA | tris(2-pyridylmethyl)amine | solid | 95% | ATRP Solutions |
| Me6TREN | tris[2-(dimethylamino)ethyl]amine | liquid | 95% | ATRP Solutions |

Synthesis of Star Copolymers (Example 1)

Example 1: Synthesis of [((MMA)$_{15}$-co-(GMA)$_2$)-(AA)$_{307}$]/[(AA)$_{20}$] Star Macromolecule (r to s is 3:1)

The "one-pot" procedure was used for the preparation of a poly(acrylic acid) based miktoarm star macromolecule similar to that described in U.S. patent application Ser. No. 61/760,210, filed on Feb. 4, 2013, which is incorporated herein by reference in its entirety. The miktoarm star macromolecule with [((MMA)$_{15}$-co-(GMA)$_2$)-(AA)$_{307}$] and [(AA)$_{20}$] arms (molar ratio of arms: 1/3) was prepared as follows.

STEP 1: Synthesis of Poly(methyl methacrylate)-co-Poly(glycerol monomethacrylate) Macroinitiator [referred to herein as ((MMA)$_{15}$-co-(GMA)$_2$)]

To prepare the ((MMA)$_{15}$-co-(GMA)$_2$) macroinitiator, the following molar ratio of reagents was used: MMA/GMA DEBMM/CuBr$_2$/TPMA/Ascorbic Acid=30/3/1/0.00165/0.01650.0043 in anisole (33% v/v). A 100 ml round bottom flask was charged with 20 ml of MMA, 3 g of GMA, 1.19 ml of DEBMM, 6 ml of anisole, and 0.8 ml of a pre-mixed CuBr$_2$/Me$_6$TREN in DMF solution. The flask was sealed with a rubber septum and the solution was purged with nitrogen for 1.0 hour, then placed in a 60° C. oil bath. To the flask was added 1.01 ml of Ascorbic Acid in DMF solution (14 mg of Ascorbic Acid in 3 mL of DMF) at the addition rate of 1 mL/h, over a period of 1 hour. After the reaction was continued for an additional 1 hour and 40 minutes, the flask was opened to air and the reaction was stopped. The resulting polymer was purified by precipitation into methanol/water (1:1 v/v), and determined to have a molecular weight of 2073 g/mol (as measured by NMR) and a PDI of 1.50 (as measured by GPC). Yield was 5.46 g of purified polymer.

STEPS 2-4: Synthesis of [((MMA)$_{15}$-co-(GMA)$_2$)-(AA)$_{307}$]/[(AA)$_{20}$] star macromolecules in "one pot" (i.e., steps 2-4 in one pot):

STEP 2: Synthesis of [((MMA)$_{15}$-co-(GMA)$_2$)-(tBA)$_{307}$]/[(tBA)$_{20}$] arms: To prepare the [((MMA)$_{15}$-co-(GMA)$_2$)-(tBA)$_{307}$]/[(tBA)$_{20}$] arms, the following molar ratio of reagents was used: tBA/((MMA)$_{15}$-co-(GMA)$_2$) (from Example 1, Step 1)/EBiB/CuBr$_2$/Me$_6$TREN/V-70=200/0.25/0.75/0.01/0.05/0.025. In a 22 ml vial was dissolved 17.2 mg CuBr$_2$ in 5.9 ml DMF and 0.1 ml Me$_6$TREN to make a stock solution of CuBr$_2$/Me$_6$TREN in DMF. A 250 ml round bottom flask was charged with 1.66 g of the ((MMA)$_{15}$-co-(GMA)$_2$) (from Example 1), 60 ml of tBA, 30 ml of anisole (33%, v/v) as the solvent, and 1.98 ml of the CuBr$_2$/Me$_6$TREN in DMF stock solution. After stirring the resulting solution for 10 min to dissolve the macroinitiator, the flask was sealed with a rubber septum, and purged with nitrogen for 40 minutes, then heated to 65° C. In a separate 22 ml vial, 19.7 mg of V-70 was dissolved in 1 ml of acetone, and the resulting solution was purged with N$_2$. The solution of V-70 in acetone was then injected in 0.1 ml aliquots every 20 minutes into the heated reaction via 1 ml syringe under N$_2$. Samples were periodically taken for analysis, and once the conversion of monomer reached 64%, to the reaction was injected 0.23 ml of EBiB. Subsequently, an additional 0.1 ml of V-70 in acetone was injected every 30 minutes. Upon monomer conversion reaching 84%, the reaction flask was opened to air.

Figure 2:
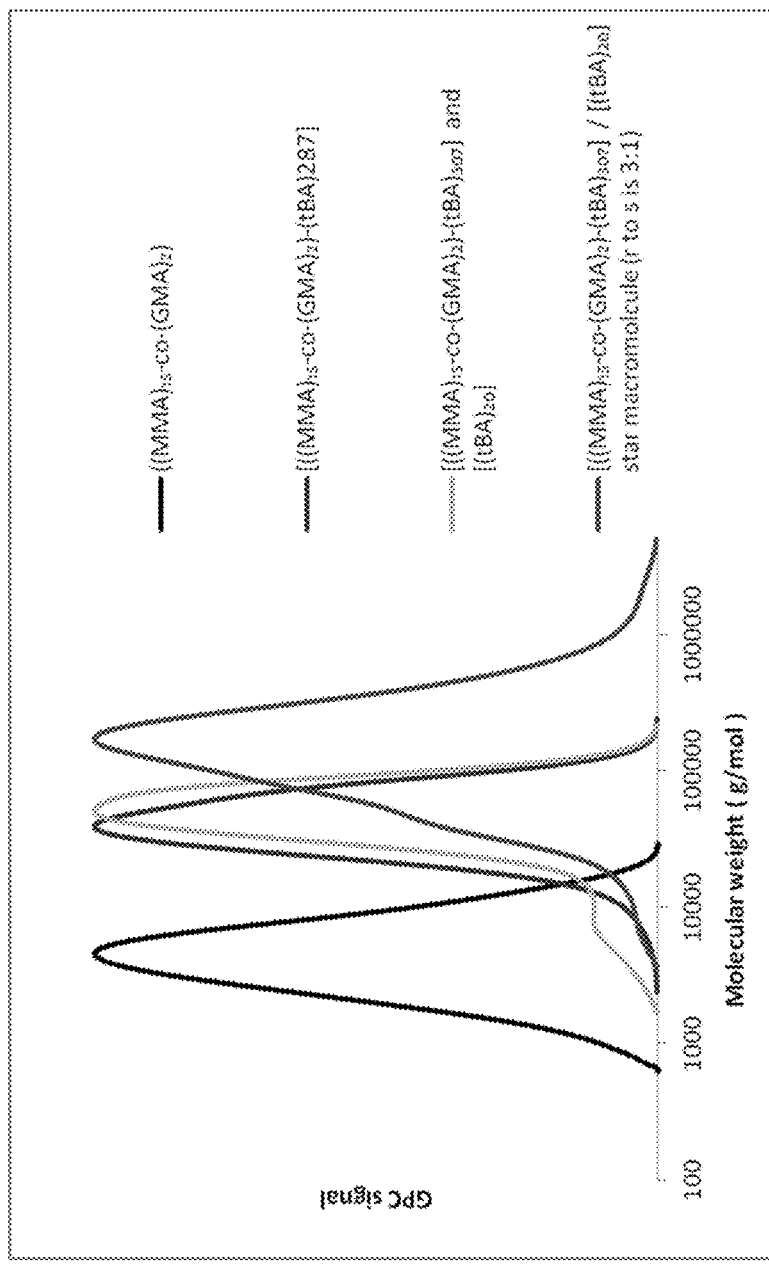
FIG. 2: GPC curve of the $((MMA)_{15}$-co-$(GMA)_2)$ macroinitiator in step 1, the block copolymer arms $[((MMA)_{15}$-co-$(GMA)_2)$-$(tBA)_{287}]$, the mixture of block copolymer arms $[((MMA)_{15}$-co-$(GMA)_2)$-$(tBA)_{307}]$ and homopolymer arms $[(tBA)_{20}]$, and the $[((MMA)_{15}$-co-$(GMA)_2)$-$(tBA)_{307}]/[(tBA)_{20}]$ star macromolecule (r to s is 3:1) in the synthesis of an exemplary $[((MMA)_{15}$-co-$(GMA)_2)$-$(AA)_{307}]/[(AA)_{20}]$ star macromolecule (r to s is 3:1).

STEP 3: Cross-linking of [((MMA)$_{15}$-co-(GMA)$_2$)-(tBA)$_{307}$]/[(tBA)$_{20}$] arms: To crosslink the [((MMA)$_{15}$-co-(GMA)$_2$)-(tBA)$_{307}$]/[(tBA)$_{20}$] arms to prepare the [((MMA)$_{15}$-co-(GMA)$_2$)-(tBA)$_{307}$]/[(tBA)$_{20}$] star macromolecules, the following molar ratio of reagents was used: {[((MMA)$_{15}$-co-(GMA)$_2$)-(tBA)$_{307}$]/[(tBA)$_{20}$]}/DVB/CuBr$_2$/Me$_6$TREN/AIBN=1/25/0.012/0.12/0.07 in anisole. In a 22 ml vial was dissolved 10.1 mg CuBr$_2$ in 6.49 ml DMF and 0.12 ml Me$_6$TREN to make a stock solution of CuBr$_2$/Me$_6$TREN in DMF. To the reaction flask was added 3.2 ml of the CuBr$_2$/Me$_6$TREN in DMF stock solution, 6.72 ml DVB, and 80 ml anisole. The resulting polymer solution was purged with N$_2$ for 1 h, and then heated to 95° C. To the reaction was added AIBN in acetone solution at an addition rate of 0.32 mL/h (the addition rate was adjusted during the polymerization process in order to control the kinetics and exothermic effects of the reaction). After 2.5 h, 0.8 mL of the $CuBr_2/Me_6TREN$ in DMF stock solution was injected into the reaction. Samples were periodically taken for analysis, and once the conversion of DVB reached 64% (at t=16 hours), the heating was stopped and the flask was opened to air. The molecular weight of $[((MMA)_{15}$-co-$(GMA)_2)$-$(tBA)_{307}]/[(tBA)_{20}]$ star macromolecule was determined by GPC. Mn=71663 g/mol, Mp=204145 g/mol, having a PDI=2.85. The GPC results were present in FIG. 2.

STEP 4: Deprotection of $[((MMA)_{15}$-co-$(GMA)_2)$-$(tBA)_{307}]/[(tBA)_{20}]$ star macromolecules: To the resulting reaction mixture of Example 3 was added 20 ml of formic acid and 0.1 ml sulfuric acid. The reaction mixture was heated up to 75° C. After 6 hours, the liquid was decanted from the reaction, and the solid polymer retained in the reaction flask was washed with acetonitrile and acetone 3 times. The washed solid polymer was then recovered from the flask and dried in vacuum oven at 40° C. for 1 day. Yield: 24 g of purified $[((MMA)_{15}$-co-$(GMA)_2)$-$(AA)_{307}]/[(AA)_{20}]$ star macromolecule (wherein the molar ratio of r to s is 3:1; P3 is AA, q3 is 20; P5 is AA, q5 is 307; P4 is $((MMA)_{15}$-co-$(GMA)_2)$, and in the designation of $((P6)_{q6}$-co-$(P7)_{q7})$, P6 is GMA, q6 is 2, P7 is MMA, and q7 is 15).

Properties of Star Copolymer (Examples 2-3)

Figure 3:
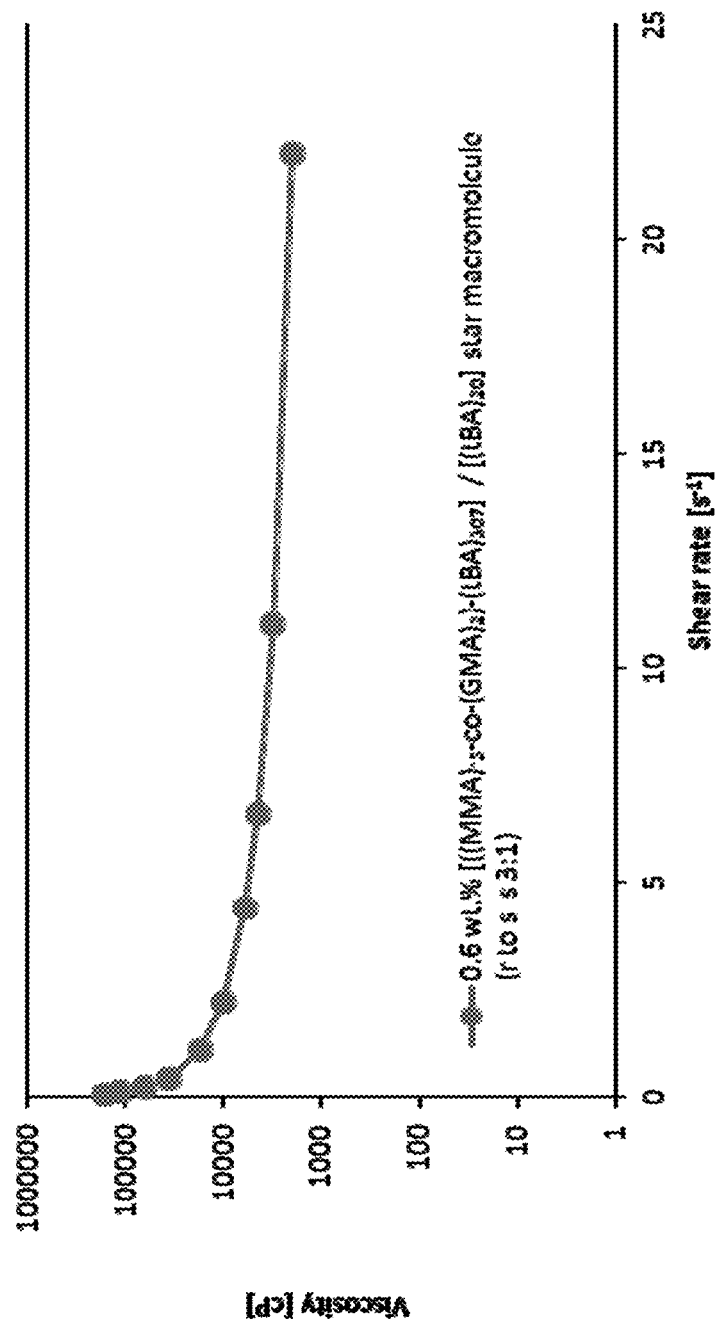
FIG. 3: is a graph of viscosity vs. shear rate of aqueous solution of 0.6 wt. % of $[((MMA)_{15}$-co-$(GMA)_2)$-$(AA)_{307}]/[(AA)_{20}]$ star macromolecule (r to s is 3:1) (from Example 1).

Example 2: Shear Thinning Test in Water-Shear Thinning Property of Star Macromolecule as Thickening Agents The thickening and rheological properties of the aqueous solutions of star macromolecules synthesized in Examples 1 (at a concentration of 0.6 wt %, and at a pH of 7.5), prepared according to the sample preparation procedure described below, were investigated. The viscosity vs. shear rate was measured using a Spindle #25 according to the Dynamic Viscosity & Shear-Thinning Test Procedure described below. The results are presented in FIG. 3 and Table 2.

TABLE 2

| Shear Rate [$s^{-1}$] | Viscosity in DI-Water @25° C. [cP] |
| --- | --- |
| 0.066 | 166000 |
| 0.11 | 113300 |
| 0.22 | 63400 |
| 0.44 | 35300 |
| 1.1 | 16990 |
| 2.2 | 9890 |
| 4.4 | 5950 |
| 6.6 | 4380 |
| 11 | 3062 |
| 22 | 1930 |

* Viscosity was measured using Brookfield LVDV-E, Spindle #25

Example 3: Borate-Crosslinked Test—Crosslinking Ability of Star Macromolecules as Thickening Agents A borate-crosslinked system of the star macromolecule of Example 1 was prepared according to the Borate-Crosslinker Thickening Test Procedure, and the resulting viscosity was measured and the Borate-Crosslinker Thickening Test value was determined.

A comparative example using $[(St)_{15}$-$(AA)_{250}]/[(AA)_{137}]$ star macromolecule (wherein the molar ratio of r to t is 4:1, and s=0; wherein P1 is St, q1 is 15, P2 is AA, q2 is 250, P3 is AA, and q3 is 137), that doesn't contain hydroxyl groups, was also evaluated. The $[(St)_{15}$-$(AA)_{250}]/[(AA)_{137}]$ star macromolecule (at a concentration of 0.6 w.t. %) was prepared as a gel according to the sample preparation procedure described below, and was also prepared as a borate-crosslinked gel according to the Borate-Crosslinker Thickening Test Procedure, and the resulting viscosity was measured and the Borate-Crosslinker Thickening Test value was determined.

The above-described Borate-crosslinked tests were performed on the homogenized gel. The results are presented in Table 3.

TABLE 3

| | Viscosity at 1 rpm [cP] | | |
| --- | --- | --- | --- |
| | Without | With cross-linker | |
| Star macromolecule | cross-linker | 0.1 wt. % | 0.2 wt. % |
| Example 1 | 63400 | 69600 | 74900 |
| $[(St)_{15}$ – $(AA)_{250}]/[(AA)_{137}]$ | 357100 | 283700 | 169400 |

Test Procedures:
Sample Preparation

Aqueous gels at various concentrations (e.g., 0.2 wt. %, 0.25 wt %, 0.4 wt. % 0.6 wt. %, 0.7 wt. % and 1.0 wt. %) were prepared as follows: 400 mL of deionized (DI) water was transferred to 600 mL beaker and stirred with an IKA overhead stirrer mounted with a 3-blade marine impeller. Water was stirred at 600 rpm to generate vortex and certain amount of thickening agent powder was slowly sprinkled. The aqueous solution was heated to 30° C. and solid NaOH was added. The stirring rate was increased to 800 rpm for 5-10 min and then adjusted to 1600 rpm for about 15-20 min until the temperature reached 80-90° C. The gel was then homogenized with a Silverson homogenizer equipped with a Square Hole workhead and an Axial Flow workhead. The homogenizer stirring speed was gradually increased to 4800±200 rpm and mixed for 35 min until a thick homogeneous gel was obtained. A pH of the resulting gel was analyzed with pH meter and adjusted (with NaOH) to pH=7.5.

Dynamic Viscosity & Shear-Thinning Test Procedure

A portion of the sample preparation was introduced into a Brookfield LVDV-E Digital Viscometer, using either a spindle #31 or spindle #25 for mixing, at STP, over a wide range of rates (e.g, 0.3-100 rpm) and the shear rate and viscosity was recorded. Viscosity measurements were taken in the following sequence, stopping the instrument after each measurement for 5 minutes, 0.3, 0.5, 1, 2, 5, 10, 20, 30, 50, and 100 rpm. The dynamic viscosity was determined as the viscosity in centipoise (cP) at 0.3 rpm or at 1 rpm. A shear-thinning value was determined by dividing the dynamic viscosity value at 0.3 rpm by the dynamic viscosity value at 20 rpm.

Borate-Crosslinker Thickening Test Procedure:

The following procedure was applied to measure the viscosity of the aqueous gels in the presence of borate crosslinker thickening agent (Borax). A Borax containing gel was prepared by adding 18 mg or 36 mg of Borax anhydrous (to eventually result in formation of a 0.1 wt. % borate crosslinker, or 0.2 wt. % borate crosslinker mixture, respectively) to a vial, along with a certain amount of 0.6 wt. % gel of the star macromolecule (prepared as described in the Sample Preparation Procedure) such that the resulting mixture has a total weight of 18 g. The borax and star macromolecule gel containing mixture were stirred at 50° C. for 2 hours, and after cooling to room temperature, the pH of the resulting gel was analyzed with pH meter and adjusted with HCl, as necessary, to pH=7.5~7.8.

The Borate-Crosslinker Thickening Test value for the tested borate-crosslinked star macromolecule was measured and recorded as the viscosity (in centipoise, cP) at a given wt. % gel (0.6 wt. % of a star macromolecule gel) in a given wt. % Borax concentration (0.2 wt. % of a Borax concentration), in accordance to the Dynamic Viscosity Test Procedure (using a Brookfield LVDV-E, Spindle #25 at T=25° C.) (for example a viscosity of 50,000 cP at 0.6 wt % gel in a 0.2 wt. % Borax concentration).

Salt-Induced Break Test Procedure

A portion of the sample preparation was introduced into 20 ml glass scintillation vial. A measured portion of NaCl was added into the vial (e.g., 0.05 wt. % relative to the total weight of the sample in the vial. After the NaCl addition was complete, the vial was closed and shaken for 10 min. Then, the viscosity of the sample was measured in accordance with the Dynamic Viscosity & Shear-Thinning Test Procedure, above, and the dynamic viscosity at 1 rpm was recorded. This procedure was repeated for differing concentrations of NaCl. The salt-induced break value, in percent, is determined by the following equation:

Initial Dynamic Viscosity(0% NaCl)−Dynamic Viscosity(0.05 wt. % NaCl)/Initial Dynamic Viscosity(0% NaCl)×100%.

pH Efficiency Range Test Procedure

An aqueous gel composition at 0.4 wt % was prepared for a star macromolecule of the present invention, at a starting pH of around 5 and a separate aqueous gel composition at 0.2 wt. % aqueous gel composition of Carbopol ETD 2020, at a starting pH of around 3, was prepared by mixing and heating, as necessary (e.g., vigorous mixing at a temperature of about 60° C.). Then, the viscosity of the sample was measured in accordance with the Dynamic Viscosity & Shear-Thinning Test Procedure, above, and the dynamic viscosity at 1 rpm was recorded. This procedure was repeated for differing pH values, adjusted by addition of sodium hydroxide. The pH-induced break value, in percent, is determined by the following equation:

Dynamic Viscosity(at 1 rpm) at pH7.5−Dynamic Viscosity(at 1 rpm) at pH5/Dynamic Viscosity (at 1 rpm) at pH7.5×100%.

Emulsion Test Procedure 340 mL of water was added to a 500 ml beaker and stirred vigorously with an overhead stirrer. 1.6 g of the material to be tested for emulsifying effect was added and heated to 80 C. The solution was pH adjusted with 400 mg of NaOH and stirring continued until a homogeneous gel was obtained. 60 ml sunflower oil was added while vigorous stirring was continued with an overhead stirrer at 80 C for 10 min or until homogenous emulsion is obtained. The mixture was allowed to cool to room temperature. Once the system cools to room temperature start timer. The emulsion value is the time, in minutes, it takes for the system to form two visible layers (phase separation).

Strong Gel Test Procedure 10 ml portion of the sample preparation material was introduced into a 20 ml glass scintillation vial. After the transfer was complete, the vial was placed on a surface and remained undisturbed for about 20 minutes at STP. The vial was then gently inverted (turned-upside down) and placed on the surface and a timer started. If after 5 minutes, there is no visible flow then the sample is said to be a strong gel.

Hydrophilic-Lipophilic (HLB) Arm/Segment Calculation $$HLB = 20 \cdot Mh/M$$

where Mh is the molecular mass of the hydrophilic portion of the polymeric arm or segment, and M is the molecular mass of the whole polymeric arm or segment.

Hydrophilic-Lipophilic Macromolecule Calculation $$HLM = \sum_{n=1}^{n=m} MW_n \cdot xHLB_n / 20 \text{ divided by } 0.3 MW_{core} + \sum_{n=1}^{n=m} MW_n$$

where $MW_n$ is the molecular weight for the respective arm, $HLB_n$ is the HLB, as calculated from the HLB arm calculation, for the respective arm, and $MW_{core}$ is the molecular weight for the core, and M is the total number of arms.

What is claimed is:

1. A dual-mechanism thickening agent, comprising a star macromolecule that forms a homogeneous gel when dissolved in water at a concentration of at least 0.05 wt. %, wherein the gel exhibits:
   a) a dynamic viscosity of at least about 20,000 cP;
   b) a shear-thinning value of at least 10;
   c) an increase in dynamic viscosity of at least about 5,000 cP in a 0.2 wt. % Borax aqueous solution, according to Borate-Crosslinker Thickening Test; or
   d) combinations thereof; and
wherein the star macromolecule comprises:
   i) a molecular weight of between about 150,000 g/mol and about 5,000,000 g/mol;
   ii) a core and at least three-types of arms; and
   iii) wherein at least one of the three-types of arms comprises a hydrophilic polymeric or copolymeric segment proximal to the core and comprising repeat units of polymerized hydrophilic monomeric residues; and a hydroxyl-containing polymeric or copolymeric segment distal to the core comprising one or more polymerized hydroxyl-containing residues.

2. The dual-mechanism thickening agent of claim 1, wherein the star macromolecule has an increase in dynamic viscosity in the range of between about 5,000 cP to about 30,000 cP, or an increase in dynamic viscosity of at least about 12%, in a 0.2 wt. % Borax aqueous solution, according to the Borate-Crosslinker Thickening Test, relative to the dynamic viscosity of a homogeneous gel of the star macromolecule with 0.0 wt. % Borax aqueous solution.

3. The dual-mechanism thickening agent of claim 1, wherein the star macromolecule has a viscosity of less than about 5,000 cP at a shear rate of 4 $sec^{-1}$.

4. The dual-mechanism thickening agent of claim 1, wherein the star macromolecule has a polydispersity index ("PDI") between about 1.0 to about 8.0.

5. The dual-mechanism thickening agent of claim 1, wherein the star macromolecule has a pH-induced break value of at least about 50%.

6. The dual-mechanism thickening agent of claim 1, wherein the star macromolecule has an emulsion value of greater than about 12 hours.

7. The dual-mechanism thickening agent of claim 1, wherein the star macromolecule is a water-soluble mikto star macromolecule.

8. The dual-mechanism thickening agent of claim 1, wherein the core comprises a hydrophobic crosslinked polymeric segment.

9. The dual-mechanism thickening agent of claim 1, wherein the star macromolecule is prepared by one or more star macromolecule processes, comprising: one-pot processes, arm first processes, Atom Transfer Radical Polymerization ("ATRP") processes, Controlled Radical Polymerization ("CRP") processes, Reversible Addition-Fragmentation Chain Transfer ("RAFT") processes, 2,2,6,6-Tetramethylpiperidine-1-oxyl ("TEMPO") processes, Nitroxide processes, Living Radical Polymerization ("LRP") processes, anionic polymerization processes, cationic polymerization processes, or combinations thereof.

10. The dual-mechanism thickening agent of claim 1, wherein the star macromolecule is a gel-forming star macromolecule.

11. A composition comprising the dual-mechanism thickening agent of claim 1.

12. The composition of claim 11, wherein the composition comprises at least about 0.05 wt. % of the star macromolecule.

13. The composition of claim 11, wherein the composition is a fracturing fluid thickening additive, a drilling well fluid thickening additive, a gelling agent, or an additive to improve oil extraction from oil sands.

14. The composition of claim 11, wherein the composition is a rheology-modifying composition having a shear-thinning value of at least 6.

15. The composition of claim 11, wherein the composition is a cosmetic composition, a personal care composition, a cleaning composition, an adhesive composition, a medical or pharmaceutical composition, a paper application composition, an agricultural composition, a coating composition, a lubricant composition, an antifoaming composition, an antifreeze composition, a corrosion inhibitor composition, a detergent composition, an ink composition, or a combination thereof.

16. The composition of claim 11, wherein the composition further comprises one or more boric acid additives or borate-type additives.

17. A fracturing fluid composition, comprising at least about 0.05 wt. % of a dual-mechanism thickening agent to improve water flooding during enhanced oil recovery, wherein the dual-mechanism thickening agent is a star macromolecule comprising:
  a) a molecular weight of greater than about 100,000 g/mol;
  b) a core having a hydrophobic crosslinked polymeric segment; and
  c) a plurality of arms comprising at least three types of arms, wherein:
    i) a first-arm-type extends beyond a second-arm-type, and said first-arm-type has a hydrophobic segment on its distal end; and
    ii) a third-arm-type extends beyond a second-arm-type, and said third-arm type has a hydroxyl-containing segment on its distal end and a hydrophilic segment proximal to the core;
wherein:
A) the composition has a shear-thinning value of at least 6; and
B) the star macromolecule, when dissolved in:
  1) water at a concentration of at least 0.05 wt. %, forms a clear, homogeneous gel, said gel having a dynamic viscosity of at least about 20,000 cP; and
  2) a 0.2 wt. % Borax aqueous solution, forms a gel, said gel having an increase in dynamic viscosity of at least about 5,000 cP, or an increase in dynamic viscosity of at least 12%, according to Borate-Crosslinker Thickening Test, relative to the dynamic viscosity of a homogeneous gel of the star macromolecule with 0.0 wt. % Borax aqueous solution.

18. The fracturing fluid composition of claim 17 further comprises one or more boric acid additives and borate-type additives.

19. The fracturing fluid composition of claim 17 is a fracturing fluid thickening additive, a drilling well fluid thickening additive, a gelling agent, or an additive to improve oil extraction from oil sands.

20. The fracturing fluid composition of claim 17, wherein the star macromolecule is prepared by one or more star macromolecule processes, comprising: one-pot processes, arm first processes, Atom Transfer Radical Polymerization ("ATRP") processes, Controlled Radical Polymerization ("CRP") processes, Reversible Addition-Fragmentation Chain Transfer ("RAFT") processes, 2,2,6,6-Tetramethylpiperidine-1-oxyl ("TEMPO") processes, Nitroxide processes, Living Radical Polymerization ("LRP") processes, anionic polymerization processes, cationic polymerization processes, or combinations thereof.

* * * * *